United States Patent
Kim

(10) Patent No.: US 10,044,850 B2
(45) Date of Patent: Aug. 7, 2018

(54) ELECTRONIC DEVICE FOR CONTROLLING TACTILE NOTIFICATIONS AND OPERATING METHOD THEREOF

(71) Applicant: Samsung Electronics Co., Ltd., Gyeonggi-do (KR)

(72) Inventor: Hyoung-Nam Kim, Seoul (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 28 days.

(21) Appl. No.: 15/246,663

(22) Filed: Aug. 25, 2016

(65) Prior Publication Data

US 2017/0061754 A1    Mar. 2, 2017

(30) Foreign Application Priority Data

Aug. 27, 2015 (KR) .................. 10-2015-0121136

(51) Int. Cl.
*H04B 3/36* (2006.01)
*H04M 1/725* (2006.01)
*H04M 19/04* (2006.01)

(52) U.S. Cl.
CPC ..... *H04M 1/72569* (2013.01); *H04M 19/047* (2013.01)

(58) Field of Classification Search
CPC .................. H04M 1/72569; H04M 19/047
USPC ...................................... 340/407.1
See application file for complete search history.

(56) References Cited

U.S. PATENT DOCUMENTS

| | | | |
|---|---|---|---|
| 2008/0084291 A1* | 4/2008 | Campion ............. | G08B 29/123 340/514 |
| 2009/0249247 A1* | 10/2009 | Tseng ................ | H04M 1/72552 715/808 |
| 2013/0157719 A1* | 6/2013 | Liu ........................ | G06F 3/017 455/556.1 |
| 2014/0129457 A1* | 5/2014 | Peeler .................. | G06Q 10/067 705/317 |
| 2015/0087282 A1 | 3/2015 | Prajapat | |

FOREIGN PATENT DOCUMENTS

| KR | 10-2010-0027610 A | 3/2010 |
|---|---|---|
| KR | 10-2012-0012906 A | 2/2012 |

* cited by examiner

*Primary Examiner* — Kerri McNally
(74) *Attorney, Agent, or Firm* — Cha & Reiter, LLC.

(57) ABSTRACT

According to one embodiment of the present disclosure, a control method of an electronic device includes: determining whether data is received by a background process of the electronic device and outputting a tactile notification notifying a user of the reception of the data when the data is received. Other embodiments are also disclosed herein.

20 Claims, 21 Drawing Sheets

ELECTRONIC DEVICE FOR CONTROLLING TACTILE NOTIFICATIONS AND OPERATING METHOD THEREOF

CLAIM OF PRIORITY

This application claims the priority under 35 U.S.C. § 119(a) to Korean Application Serial No. 10-2015-0121136, which was filed in the Korean Intellectual Property Office on Aug. 27, 2015, the entire content of which is hereby incorporated by reference.

TECHNICAL FIELD

Various embodiments of the present disclosure relate to a control method for an electronic device. For example, the present disclosure discloses a method for outputting tactile notifications notifying the user of the electronic device of a download event.

BACKGROUND

Various electronic devices (e.g., smart phones, tablets, or the like) may output notifications to the user via auditory, visual, or tactile means. Visual notifications may be displayed on a display of the electronic device. Auditory notifications may be outputted via a speaker of the electronic device.

For tactile notifications, a motor or haptic engine may be embedded in a smart phone, and the motor or haptic engine may be driven to notify the smart phone's user of an event generated in the smart phone.

For example, when the user touches the smart phone using his or her finger, the smart phone may detect the user's touch and output vibrations using the motor in the smart phone based on the detection.

As described above, using the motor in the smart phone, the smart phone may tactilely notify the user and this may be referred to as a "haptic" technique.

The haptic technique in other words refers to a technique which allows the user to feel tactile sense and force in addition to the conventional audio-visual information.

As described above, the haptic technique also refers to a technique which notifies the user through a vibration motor, referred to as an actuator that induces a specific tactile sensation in the user.

For example, in the case in which the user makes a phone call using the smart phone, the user feels the tactile sensation when the user presses a number pad displayed on a keypad of the smart phone. Further, in the case in which a game is running on the smart phone, vibration energy can be outputted to the user when the user is performing a specific act in the game.

SUMMARY

As described above, the conventional electronic device may apply haptic feedback to the user. More specifically, haptic feedback can be generated for a number of events, such as a screen touch, notification (ringtone, alarm, timer, schedule, message, and e-mail notification), operation feedback (power on, USB or charger cable connection, and battery lack notification), etc.

However, in the prior art, when the electronic device newly receives data reception, for example, when the electronic device moves from a place (e.g. elevator) in which the electronic device does not receive a data reception service or a Wi-Fi connection area to an area capable of LTE/3G data network (or vice versa), the electronic device may initiate data downloads, such as software updates, in a background process of the electronic device. For various reasons, such as restrictions of the data network, the user may not want to the download to occur but is unaware that it has already been initiated.

The present disclosure provides functionalities which can prevent software from continuously being downloaded in a situation where the user is unaware that the download is occurring. The disclosed functionalities accomplishes this by driving a motor or a haptic engine to notify the user that a download is taking place.

In accordance with an aspect of the present disclosure, a method of controlling an electronic device is provided. The method includes: determining whether data is received by a background process of the electronic device and outputting a tactile notification notifying a user of the reception of the data when the data is received.

In accordance with another aspect of the present disclosure, an electronic device is provided. The electronic device includes: a communication module configured to be received data, an output module that outputs a tactile notification, and a processor configured to determine whether data is received by a background process of the electronic device through the communication module and output, through the output module, the tactile notification notifying a user of the reception of the data when the data is received.

According to one embodiment of the present disclosure, when the electronic device is downloading software in the background, the electronic device may also drive a motor to notify a user of the download to prevent software from being downloaded if the user does not wish the download to take place. As a result, the electronic device can prevent undesired reception of data in situations such as when the user has to pay the mobile carrier for the data download.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
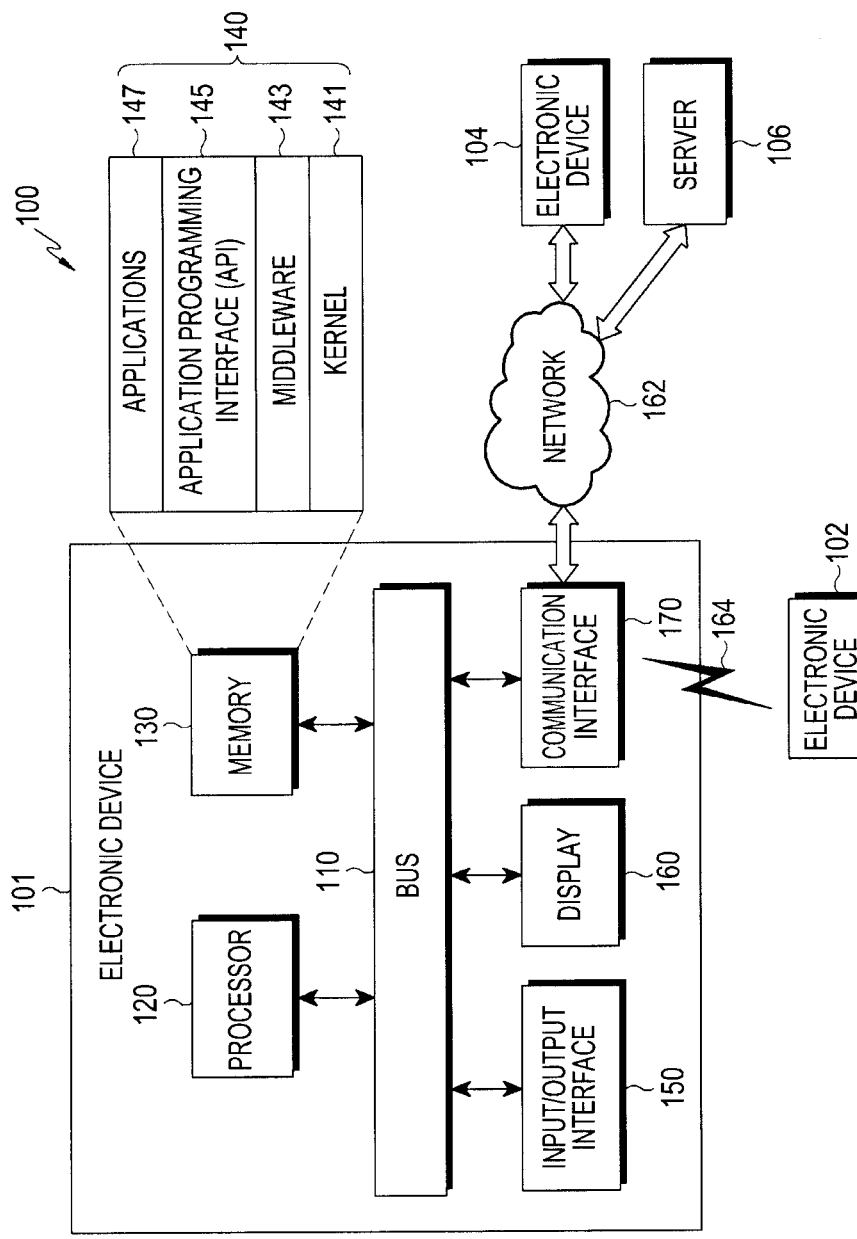
FIG. 1 illustrates a network environment including an electronic device according to various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the terms defined herein may not be construed to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g. an artificial intelligence electronic device) using an electronic device.

FIG. 1 illustrates a network environment including an electronic device according to various embodiments of the present disclosure.

An electronic device 101 in a network environment 100 according to various embodiments will be described with reference to FIG. 1. The electronic device 101 may include a bus 110, a processor 120, a memory 130, an input/output interface 150, a display 160, and a communication interface 170. In some embodiments, the electronic device 101 may omit at least one of the elements, or may further include other elements.

The bus 110 may include, for example, a circuit for interconnecting the elements 120 to 170 and transferring communication (for example, control messages and/or data) between the elements.

The processor 120 may include one or more of a Central Processing Unit (CPU), an Application Processor (AP), and a Communication Processor (CP). For example, the processor 120 may carry out operations or data processing related to control and/or communication of at least one other component of the electronic device 101.

The memory 130 may include a volatile memory and/or a non-volatile memory. The memory 130 may store, for example, instructions or data relevant to at least one other element of the electronic device 101. According to an embodiment, the memory 130 may store software and/or a program 140. The program 140 may include a kernel 141, middleware 143, an Application Programming Interface (API) 145, and/or application programs (or "applications") 147. At least some of the kernel 141, the middleware 143, and the API 145 may be referred to as an Operating System (OS).

In the present document, an application may be referred to as an app or an application.

The kernel 141 may control or manage system resources (for example, the bus 110, the processor 120, or the memory 130, and/or other hardware and software resources) used for performing an operation or function implemented by the other programs (for example, the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data.

In addition, the middleware 143 may process one or more task requests received from the application programs 147 according to priorities thereof. For example, the middleware 143 may assign priorities for using the system resources (for example, the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (for example, instruction) for file control, window control, image processing, or text control.

The input/output interface 150 may function as, for example, an interface that may transfer instructions or data input from a user or another external device to the other element(s) of the electronic device 101. Furthermore, the input/output interface 150 may output the instructions or data received from the other element(s) of the electronic device 101 to the user or another external device.

The display 160 may include, for example, a Liquid Crystal Display (LCD), a Light-Emitting Diode (LED) display, an Organic Light-Emitting Diode (OLED) display, a MicroElectroMechanical Systems (MEMS) display, and an electronic paper display. The display 160, for example, may display various types of contents (for example, text, images, videos, icons, or symbols) for the user. The display 160 may include a touch screen, and may receive, for example, a touch, gesture, proximity, or hovering input by using an electronic pen or a part of the user's body using capacitive, resistive, or another type of technology.

According to one embodiment of the present disclosure, the display 160 may be used the same as a touch screen.

The communication interface 170, for example, may set communication between the electronic device 101 and an external device (e.g., a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. In addition, the wireless communication may include, for example, short range communication 164. The short range communication 164 may include, for example, at least one of Wi-Fi, Bluetooth, Near Field Communication (NFC), Global Navigation Satellite System (GNSS), and the like. The GNSS may include at least one of, for example, a Global Positioning System (GPS), a Global navigation satellite system (Glonass), a Beidou navigation satellite system (hereinafter, referred to as "Beidou"), and Galileo (European global satellite-based navigation system). Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), and a Plain Old Telephone Service (POTS). The network 162 may include at least one of a communication network such as a computer network (for example, a LAN or a WAN), the Internet, and a telephone network.

Each of the first and second external electronic devices 102 and 104 may be of a type identical to or different from that of the electronic device 101. According to an embodiment, the server 106 may include a group of one or more servers. According to one embodiment, all or some of the operations performed in the electronic device 101 may be performed in another electronic device or a plurality of electronic devices (e.g., the external electronic devices 102 and 104 or the server 106). According to an embodiment, when the electronic device 101 has to perform a function or service automatically or in response to a request, the electronic device 101 may request another device (e.g., the external electronic device 102 or 104, or the server 106) to perform at least some functions relating thereto, instead of autonomously or additionally performing the function or service. Another electronic device (for example, the external electronic device 102 or 104, or the server 106) may execute the requested functions or the additional functions, and may deliver a result of the execution to the electronic device 101. The electronic device 101 may process the received result as it is or additionally process the result to provide the requested functions or services. To achieve this, for example, cloud computing, distributed computing, or client-server computing technology may be used.

Figure 2:
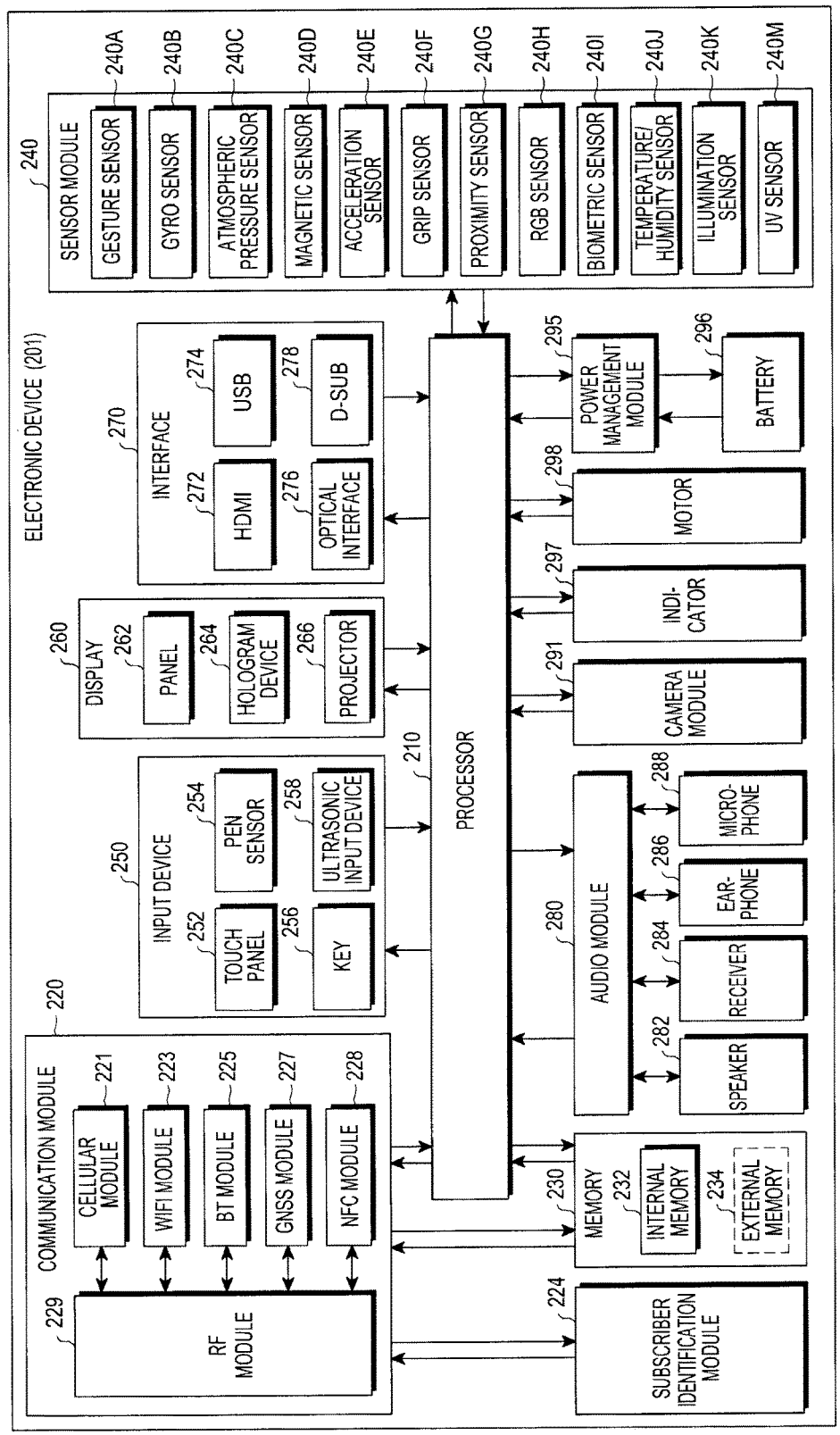
FIG. 2 is a block diagram of hardware of the electronic device according to various embodiments of the present disclosure.

FIG. 2 is a block diagram of hardware of the electronic device according to various embodiments of the present disclosure.

The electronic device 201 may include, for example, the whole or part of the electronic device 101 illustrated in FIG. 1. The electronic device 201 may include at least one processor 210 (for example, an Application Processor (AP)), a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program and perform processing of various pieces of data and calculations. The processor 210 may be implemented by, for example, a System on Chip (SoC). According to an embodiment, the processor 210 may further include a Graphic Processing Unit (GPU) and/or an image signal processor. The processor 210 may include at least some (for example, a cellular module 221) of the elements illustrated in FIG. 2. The processor 210 may load, into a volatile memory, instructions or data received from at least one (for example, a non-volatile memory) of the other elements and may process the loaded instructions or data, and may store various data in a non-volatile memory. The control unit or processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The communication module 220 may have a configuration equal or similar to that of the communication interface 170 of FIG. 1. The communication module 220 may include, for example, a cellular module 221, a Wi-Fi module 223, a Bluetooth module 225, a GNSS module 227 (e.g., a GPS module, a Glonass module, a Beidou module, or a Galileo module), an NFC module 228, and a Radio Frequency (RF) module 229.

The cellular module 221 may provide a voice call, an image call, a text message service, or an Internet service through, for example, a communication network. According to an embodiment, the cellular module 221 may distinguish between and authenticate electronic devices 201 within a communication network using a subscriber identification module (for example, the SIM card 224). According to an embodiment, the cellular module 221 may perform at least some of the functions that the AP 210 may provide. According to an embodiment, the cellular module 221 may include a Communication Processor (CP).

The Wi-Fi module 223, the Bluetooth module 225, the GNSS module 227, or the NFC module 228 may include, for example, a processor that processes data transmitted and received through the corresponding module. In some embodiments, at least some (two or more) of the cellular module 221, the Wi-Fi module 223, the Bluetooth module 225, the GNSS module 227, and the NFC module 228 may be included in a single Integrated Chip (IC) or IC package.

The RF module 229 may transmit/receive, for example, a communication signal (for example, an RF signal). The RF module 229 may include, for example, a transceiver, a Power Amp Module (PAM), a frequency filter, a Low Noise Amplifier (LNA), or an antenna. According to another embodiment, at least one of the cellular module 221, the Wi-Fi module 223, the Bluetooth module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 or an external memory 234. The embedded memory 232 may include at least one of, for example, a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a flash memory (for example, a NAND flash memory or a NOR flash memory), a hard driver, or a Solid State Drive (SSD).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a Multi-Media Card (MMC), a memory stick, or the like. The external memory 234 may be functionally and/or physically connected to the electronic device 201 through various interfaces.

The sensor module 240 may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, a light sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments, the electronic device 201 may further include a processor, which is configured to control the sensor module 240, as a part of the processor 210 or separately from the processor 210 in order to control the sensor module 240 while the processor 210 is in a sleep state.

The input device 250 may include, for example, a touch panel 252, a (digital) pen sensor 254, a key 256, and an ultrasonic input device 258. The touch panel 252 may use at least one of, for example, a capacitive scheme, a resistive scheme, an infrared scheme, and an ultrasonic scheme. Further, the touch panel 252 may further include a control circuit. The touch panel 252 may further include a tactile layer and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic waves generated by an input tool through a microphone (for example, the microphone 288) and identify data corresponding to the detected ultrasonic waves.

The display 260 (for example, the display 160) may include a panel 262, a hologram device 264 or a projector 266. The panel 262 may include a configuration identical or similar to that of the display 160 illustrated in FIG. 1. The panel 262 may be implemented to be, for example, flexible, transparent, or wearable. The panel 262 and the touch panel 252 may be implemented as one module. The hologram device 264 may show a three dimensional image in the air by using an interference of light. The projector 266 may display an image by projecting light onto a screen. The screen may be located, for example, in the interior of or on the exterior of the electronic device 201. According to an embodiment, the display 260 may further include a control circuit for controlling the panel 262, the hologram device 264, or the projector 266.

According to one embodiment of the present disclosure, the display 160 including the panel 262 may be used to be the same as or similar to the touch screen. That is, the touch screen may be defined to include the display 160 for displaying specific information and the panel 262 which can receive a touch input.

The interface 270 may include, for example, a High-Definition Multimedia Interface (HDMI) 272, a Universal Serial Bus (USB) 274, an optical interface 276, or a D-sub-miniature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may bilaterally convert, for example, a sound and an electrical signal. At least some elements of the audio module 280 may be included in, for example, the input/output interface 150 illustrated in FIG. 1. The audio module 280 may process sound information which is input or output through, for example, a speaker 282, a receiver 284, earphones 286, the microphone 288 or the like.

The camera module 291 is, for example, a device which may photograph a still image and a video. According to an embodiment of the present disclosure, the camera module 291 may include one or more image sensors (e.g., a front sensor or a back sensor), a lens, an Image Signal Processor (ISP) or a flash (e.g., LED or xenon lamp).

The power management module 295 may manage, for example, power of the electronic device 201. According to an embodiment, the power management module 295 may include a Power Management Integrated Circuit (PMIC), a charger Integrated Circuit (IC), or a battery or fuel gauge. The PMIC may have a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature during the charging. The battery 296 may include, for example, a rechargeable battery and/or a solar battery.

The indicator 297 may indicate a particular state (for example, a booting state, a message state, a charging state, or the like) of the electronic device 201 or a part (for example, the processor 210) of the electronic device 201. The motor 298 may convert an electrical signal into mechanical vibration, and may generate vibration, a haptic effect, or the like. Although not illustrated, the electronic device 201 may include a processing unit (for example, a GPU) for supporting a mobile television (TV). The processing unit for supporting mobile TV may, for example, process media data according to a certain standard such as Digital Multimedia Broadcasting (DMB), Digital Video Broadcasting (DVB), or mediaFLO™.

Each of the above-described component elements of hardware according to the present disclosure may be configured with one or more components, and the names of the corresponding component elements may vary based on the type of electronic device. In one embodiment, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
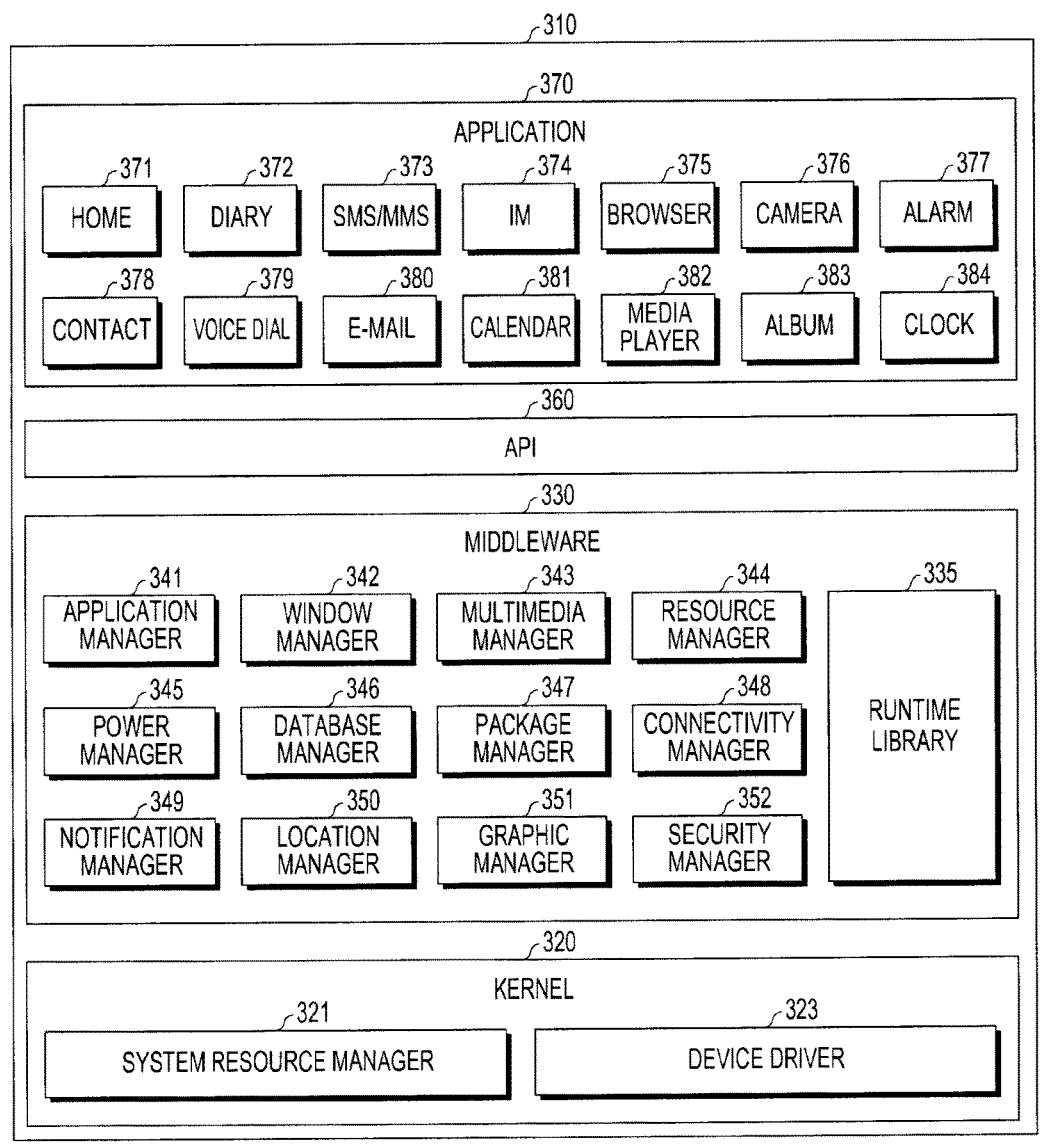
FIG. 3 is a block diagram illustrating a program module according to various embodiments of the present disclosure.

FIG. 3 is a block diagram illustrating a program module according to various embodiments of the present disclosure.

According to an embodiment, a program module 310 (for example, the program 140) may include an Operating System (OS) for controlling resources related to the electronic device (for example, the electronic device 101) and/or various applications (for example, the application programs 147) executed in the operating system. The operating system may be, for example, Android, iOS, Windows, Symbian, Tizen, Bada, or the like.

The program module 310 may include a kernel 320, middleware 330, an Application Programming Interface (API) 360, and/or applications 370. At least a part of the program module 310 may be preloaded on the electronic device, or may be downloaded from an external electronic device (e.g., the external electronic device 102 or 104, or the server 106).

The kernel 320 (for example, the kernel 141) may include, for example, a system resource manager 321 and/or a device driver 323. The system resource manager 321 may control, assign, or collect system resources. According to an embodiment, the system resource manager 321 may include a process management unit, a memory management unit, or a file system management unit. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide a function required by the applications 370 in common or provide various functions to the applications 370 through the API 360 so that the applications 370 can efficiently use limited system resources within the electronic device. According to an embodiment, the middleware 330 (e.g., the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add new functions through a programming language while the applications 370 are executed. The runtime library 335 may perform input/output management, memory management, or a function for an arithmetic function.

The application manager 341 may, for example, manage a life cycle of at least one of the applications 370. The window manager 342 may manage Graphical User Interface (GUI) resources used on a screen. The multimedia manager 343 may identify formats required for the reproduction of various media files and encode or decode a media file using a codec suitable for the corresponding format. The resource manager 344 may manage resources of at least one of the applications 370, such as a source code, a memory, and a storage space.

The power manager 345 may operate together with, for example, a Basic Input/Output System (BIOS) to manage a battery or power and may provide power information required for the operation of the electronic device. The database manager 346 may generate, search for, and/or change a database to be used by at least one of the applications 370. The package manager 347 may manage the installation or the updating of an application distributed in the form of a package file.

The connectivity manager 348 may manage a wireless connection such as, for example, Wi-Fi or Bluetooth. The notification manager 349 may display or notify of an event, such as an arrival message, an appointment, proximity notification, and the like, in such a manner of not disturbing a user. The location manager 350 may manage location information of the electronic device. The graphic manager 351 may manage a graphic effect to be provided to a user and a user interface relating to the graphic effect. The security manager 352 may provide all security functions required for system security or user authentication. According to an embodiment, when the electronic device (e.g., the electronic device 101) has a telephone call function, the middleware 330 may further include a telephony manager that manages a voice or video call function of the electronic device.

The middleware 330 may include a middleware module that forms combinations of various functions of the above described elements. The middleware 330 may provide modules specialized according to types of operating systems in order to provide differentiated functions. Furthermore, the middleware 330 may dynamically remove some of the existing elements, or may add new elements.

The API 360 (for example, the API 145) is, for example, a set of API programming functions, and may be provided with a different configuration according to an OS. For example, in the case of Android or iOS, one API set may be provided for each platform, and in the case of Tizen, two or more API sets may be provided for each platform.

The applications 370 (e.g., the application programs 147) may include, for example, one or more applications that can perform functions, such as home 371, diary 372, SMS/MMS 373, Instant Message (IM) 374, browser 375, camera 376, alarm 377, contacts 378, voice dialer 379, e-mail 380, calendar 381, media player 382, album 383, clock 384, health care (e.g., measure exercise quantity or blood sugar), or environment information provision (e.g., provide atmospheric pressure, humidity, temperature information or the like).

According to an embodiment, the applications 370 may include an application (hereinafter, referred to as an "information exchange application" for convenience of description) that supports information exchange between the electronic device (e.g., the electronic device 101) and an external electronic device (e.g., the external electronic device 102 or 104). The information exchange application may include, for example, a notification relay application for transferring specific information to an external electronic device or a device management application for managing an external electronic device.

For example, the notification relay application may include a function of transferring, to the external electronic device (for example, the external electronic device 102 or 104), notification information generated from other applications of the electronic device (for example, an SMS/MMS application, an e-mail application, a health management application, or an environmental information application). Further, the notification relay application may receive notification information from, for example, an external electronic device and provide the received notification information to a user.

The device management application may manage (for example, install, delete, or update), for example, at least one function of an external electronic device (for example, the external electronic device 102 or 104) communicating with the electronic device (for example, a function of turning on/off the external electronic device itself (or some components) or a function of adjusting luminance (or a resolution) of the display), applications operating in the external electronic device, or services provided by the external electronic device (for example, a call service and a message service).

According to an embodiment, the applications 370 may include applications (e.g., a health care application of a mobile medical appliance, etc.) designated according to the attributes of an external electronic device (e.g., the external electronic device 102 or 104). According to an embodiment, the applications 370 may include applications received from an external electronic device (e.g., the server 106 or the external electronic device 102 or 104). According to an embodiment, the applications 370 may include a preloaded application or a third party application that may be downloaded from a server. The names of the elements of the program module 310, according to the embodiment illustrated in the drawing, may vary according to the type of operating system.

According to one embodiment, at least a part of the programming module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

Figure 4:
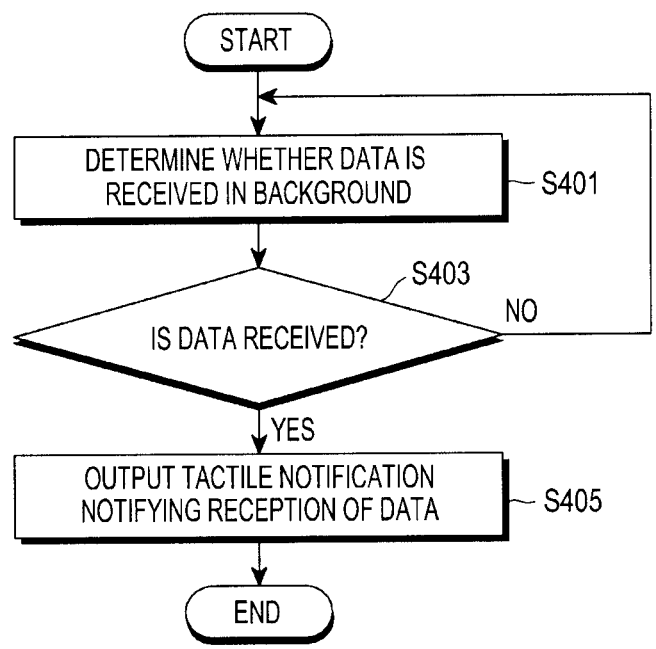
FIG. 4 is a flow chart illustrating a control method of the electronic device according to one embodiment of the present disclosure.

FIG. 4 is a flow chart illustrating a control method of the electronic device according to one embodiment of the present disclosure.

As shown in FIG. 4, in operation S401, an electronic device (e.g., the electronic device 101) may determine whether data is received in the background of the electronic device 101, i.e. whether data is received by a background process or software running in the electronic device 101.

According to one embodiments, the electronic device 101 may determine whether data related to an application stored in the electronic device 101 is received in the background. For example, the data related to the application may include an update file of the application. Upon execution, the update file may update the application to the latest version.

According to one embodiment, the background may refer to an application that is executing on the electronic device 101 but the user interface associated with the application is not displayed on a display (e.g., the display 160) of the electronic device 101. For example, when the electronic device 101 is moved from an area where data cannot be received to an area where the data can be received, the electronic device 101 may detect movement to the area where the data can be received, and automatically receive data (e.g., an application update file) without a user's input.

When it is determined that the data is received in the background in operation S403, the electronic device 101 may output a tactile notification notifying a user of reception of the data in operation S405.

According to one embodiments, the electronic device 101 may output the tactile notification notifying reception of the data in the background, wherein the tactile notification may include, for example, a vibration by a motor (e.g., the motor 298) of the electronic device 101. For example, the vibration by the motor 298 may be a haptic effect generated by the motor 298.

When it is determined that the data is not received in the background in operation S403, the electronic device 101 may loop back to operation S401.

Figure 5:
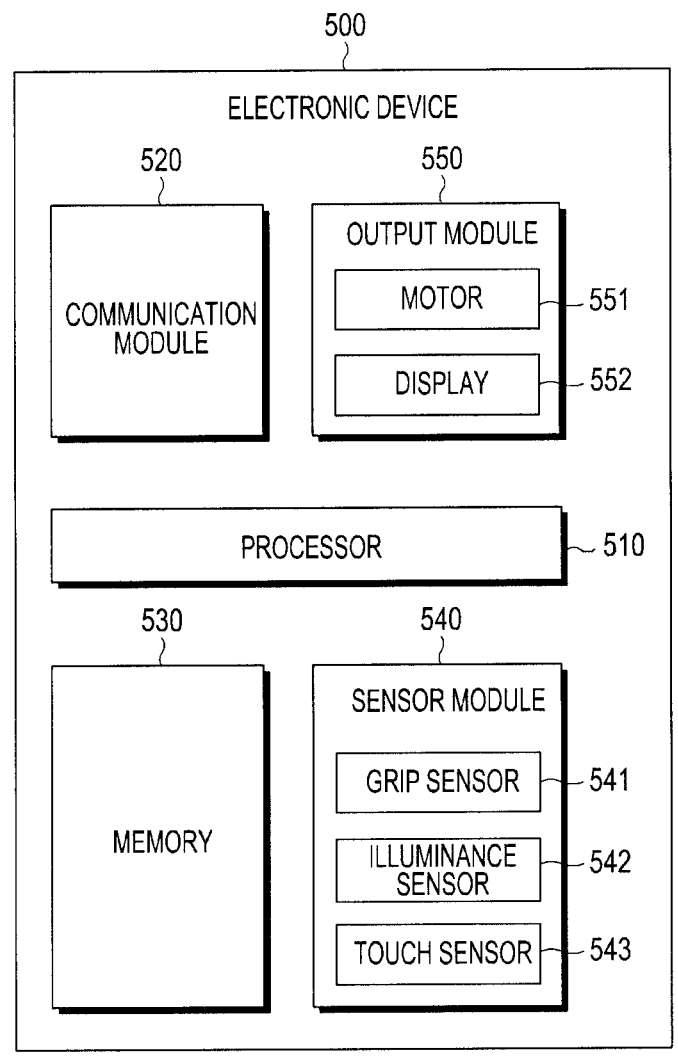
FIG. 5 is a block diagram illustrating an example of the electronic device according to one embodiment of the present disclosure.

FIG. 5 is a block diagram illustrating an example of the electronic device according to one embodiment of the present disclosure.

As shown in FIG. 5, according to one embodiment, an electronic device 500 may include a communication module 520, an output module 550, a processor 510, a memory 530, and a sensor module 540.

According to one embodiment, the communication module 520 may receive data from an external electronic device (e.g., the external electronic device 102) according to a control signal of the processor 510.

According to one embodiment, the sensor module 540 may include a grip sensor 541, an illumination sensor 542, and a touch sensor 543. For example, the grip sensor 541 may sense an input of the user gripping the electronic device 500. For example, the illumination sensor 542 may sense the external illuminance around the electronic device 500. For example, the touch sensor 543 may be included in the electronic device 500 while being coupled with a display 552, and may sense a touch input to the display 552 of the electronic device 500. The sensor module 540 may transmit the input sensed by the grip sensor 541, the illumination sensor 542, and the touch sensor 543 to the processor 510.

According to one embodiment, an output module 550 may output, through the motor 551, tactile notification notifying the user of the reception of the data received through the communication module 520, according to the control signal of the processor 510. According to one embodiment, the output module 550 may output, through the display 552, a visual notification notifying the user of the reception of the data received through the communication module 520, according to the control signal of the processor 510.

According to one embodiment, a memory 530 may store data for one or more applications and software programs executed by the electronic device 500. According to one embodiment, the memory 530 may store an application update file received through the communication module 520.

According to one embodiment, the memory 530 may store a condition for the output of tactile notification. For example, the memory 530 may store a reception condition that will prompt the tactile notification to be output. For example, the reception condition may be stored in a list. For example, a tactile output target list may be stored and include a list of applications of a list of types of data related to a specific application. For example, the tactile output target list may also include execution states of applications related to the received data, sources of the application or the received data, or size information of the data.

According to one embodiment, the processor 510 may determine whether data is received through the communication module 520.

According to one embodiment, the processor 510 may obtain a tactile output target list stored in the memory 530, and determines whether the received data corresponds to at least one condition in the obtained tactile notification output target list. According to one embodiment, the processor 510 may control the output module 550 to output the tactile notification as a result of determining that the received data corresponds to (i.e. satisfies) at least one condition stored in the tactile output target list.

According to one embodiment, the processor 510 may interrupt an output of tactile notification output through the output module 550 or resume the interrupted output, on the basis of an input from the sensor module 540. For example, through the sensor module 540, the processor 510 may determine whether the illuminance around the electronic device 500 increases to a predetermined value, or whether a gripping input of gripping the electronic device 500 and/or a touch input to the electronic device 500 is received. Then, according to a result of the determination, the processor may interrupt or resume the output of the tactile notification, depending on the state of the output According to one embodiment, the processor 510 may determine whether a predetermined time elapses when the tactile notification is interrupted, and may resume the output of the tactile notification as a result of the determination.

According to one embodiment, the processor 510 may control the type of the tactile notification. For example, the processor 120 may adjust the duration, the intensity, or the output cycle of the tactile notification on the basis of, for example, the size of the received data.

FIG. 6 illustrates a method of outputting tactile notification of the electronic device according to one embodiment of the present disclosure.

Figure 6A:
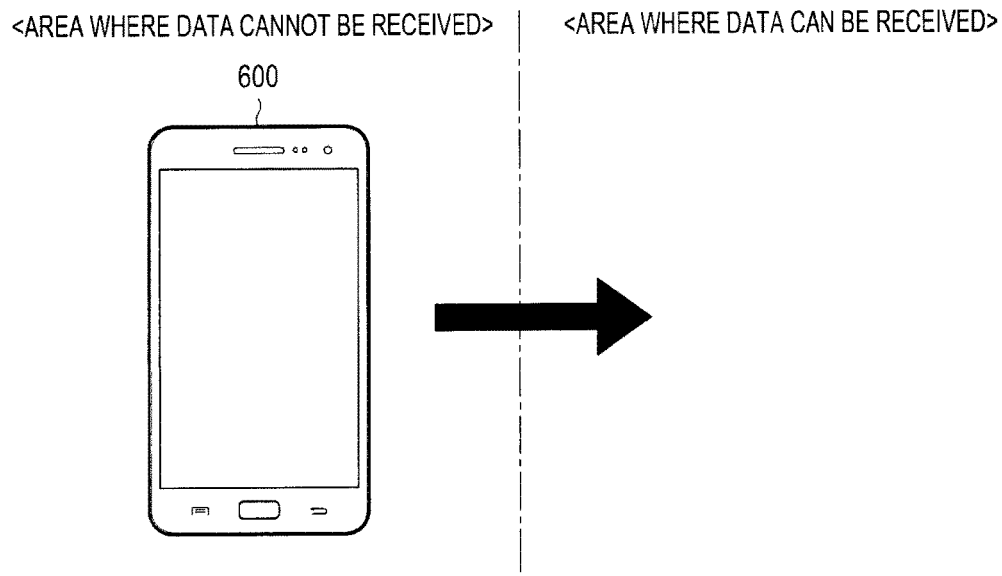
FIG. 6A and FIG. 6B illustrate a method of outputting tactile notification of the electronic device according to one embodiment of the present disclosure.

As shown in FIG. 6A, when an electronic device 600 moves from an area where data cannot be received to an area where data can be received, the electronic device 600 may receive data (e.g., an application update file) in the background.

Figure 6B:
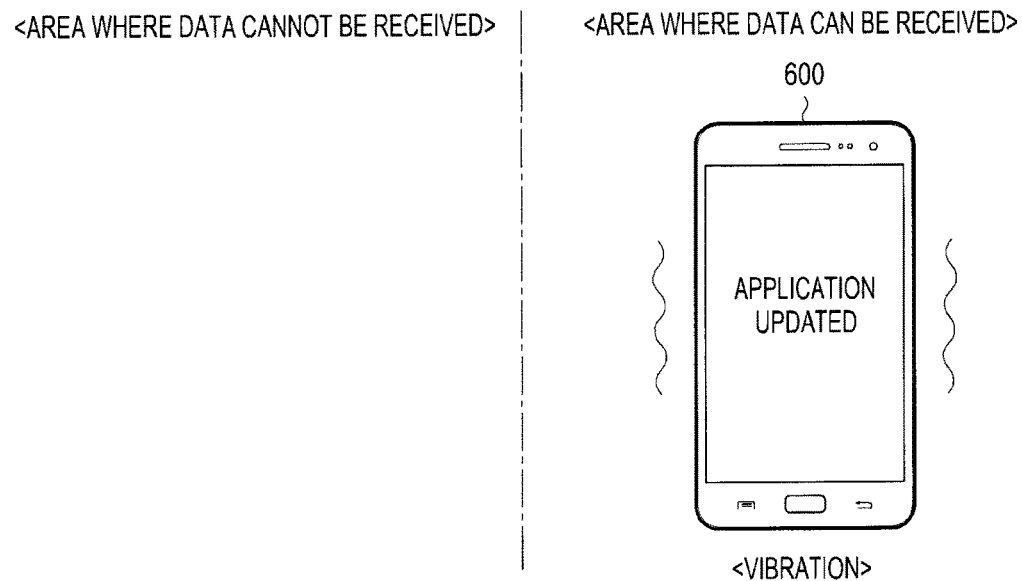

As shown in FIG. 6B, according to one embodiment, when the electronic device 600 moves from the area where data cannot be received to the area where data can be received, the electronic device 600 may display a visual notification "application automatic updated" via the display. According to one embodiment, when the electronic device 600 moves from the area where data cannot be received to the area where data can be received, the electronic device 600 may output a tactile notification or vibration notifying reception of data.

Figure 7A:
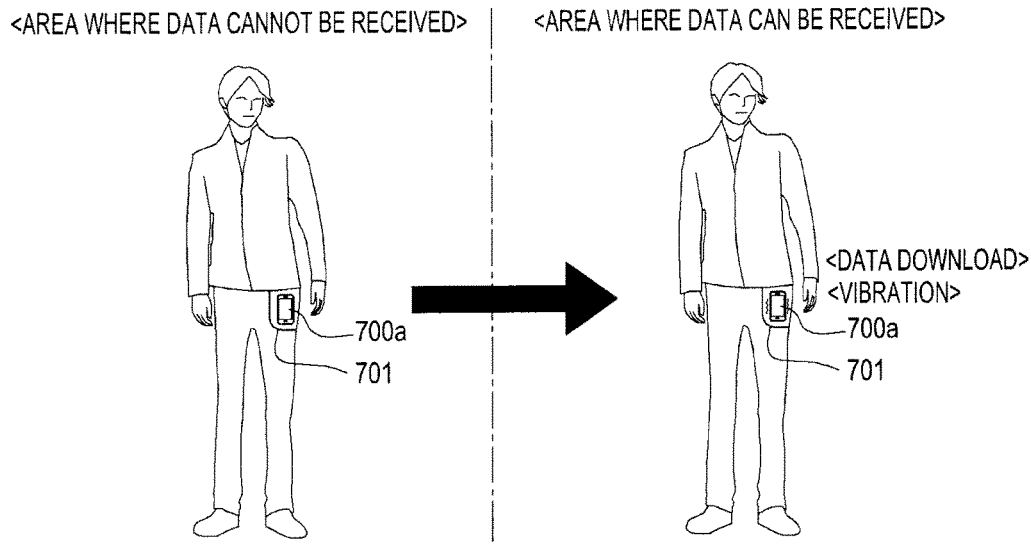
FIG. 7A illustrates an example of the method of outputting tactile notification of the electronic device according to one embodiment of the present disclosure.

FIG. 7A illustrates an example of the method of outputting tactile notification of the electronic device according to one embodiment of the present disclosure.

As shown in FIG. 7A, according to one embodiments, when the electronic device 700a is located in the user's pocket, as indicated by reference numeral 701, the electronic device 700a and the user may move from the area where data cannot be received to the area where data can be received. According to one embodiment, upon moving to the area where the data can be received, the electronic device 700a may download data in the background. According to one embodiment, when the data is downloaded in the background, the electronic device 700a may output the tactile notification, thereby notifying the user even though the electronic device is in the user's pocket.

Figure 7B:
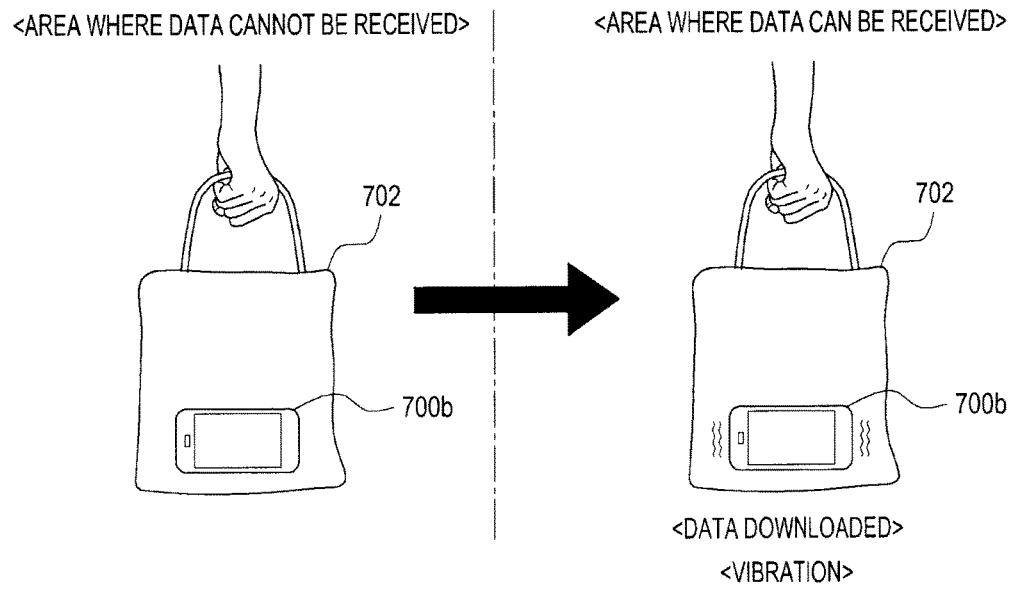
FIG. 7B illustrates an example of the method of outputting tactile notification of the electronic device according to one embodiment of the present disclosure.

FIG. 7B illustrates an example of the method of outputting tactile notification of the electronic device according to one embodiment of the present disclosure.

As shown in FIG. 7B, according to one embodiment, when the electronic device 700b is located in a user's bag 702, the electronic device 700b may move from an area where data cannot be received to an area where data can be received. According to one embodiment, upon moving to the area where data can be received, the electronic device 700b may receive data in the background. And when the data is downloaded in the background, the electronic device 700b may output tactile notifications or vibrations.

Figure 8:
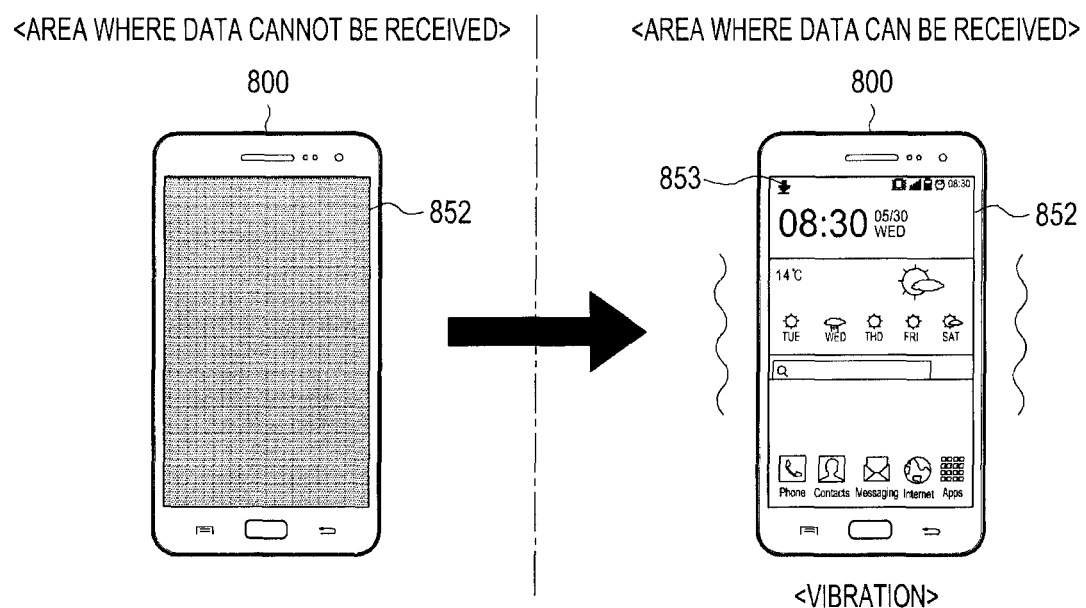
FIG. 8 illustrates a method of notifying a user of data reception of the electronic device according to one embodiment of the present disclosure.

FIG. 8 illustrates a method of notifying a user of data reception of the electronic device according to one embodiment of the present disclosure.

As shown in FIG. 8, when an electronic device 800 moves from an area where data cannot be received to an area where data can be received, the electronic device 800 may display a reception icon 853 notifying reception of data through a display 852 and may output a vibration (tactile notification) through a motor (e.g., the motor 551).

Figure 9A:
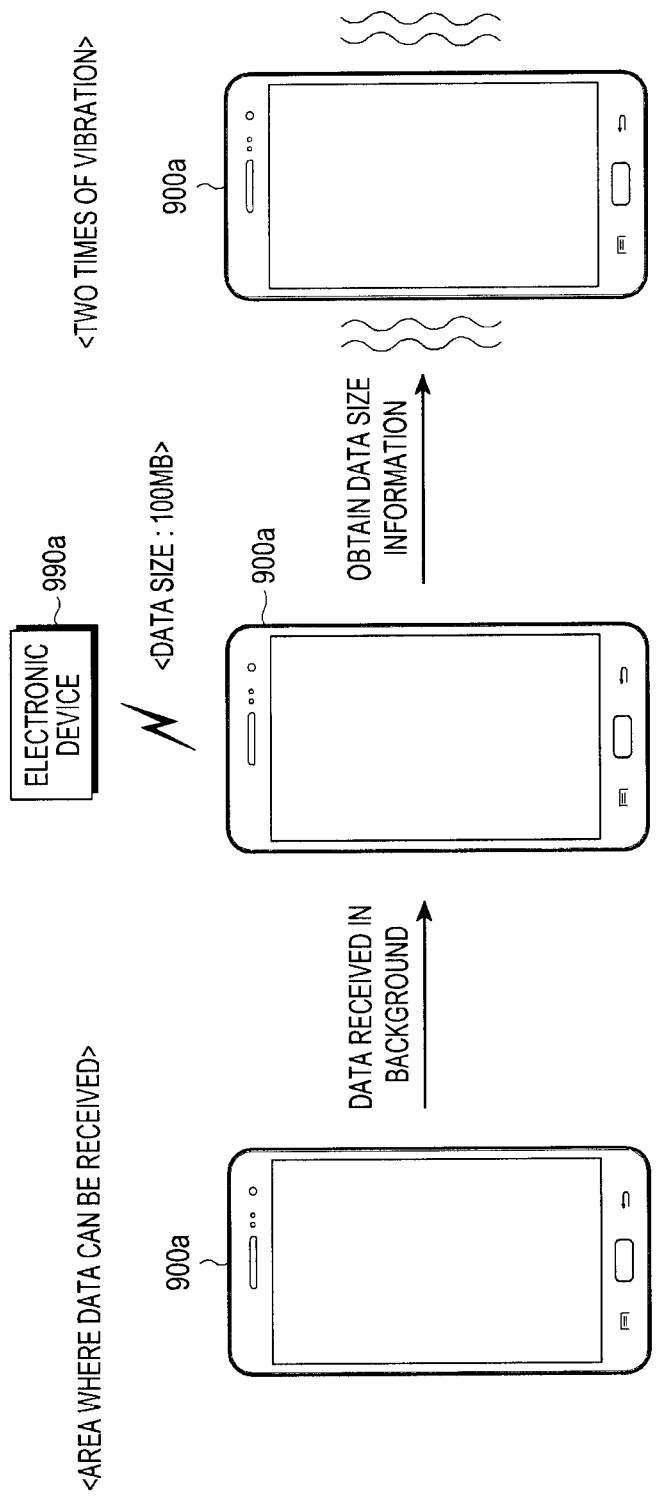
FIG. 9A illustrates an example of a method of outputting tactile notification by the electronic device on the basis of a characteristic of the received data according to one embodiment of the present disclosure.

FIG. 9A illustrates an example of a method of outputting tactile notification by the electronic device on the basis of a characteristic of the received data according to one embodiment of the present disclosure.

As shown in FIG. 9A, according to one embodiment, when an electronic device 900a moves to an area where data can be received, the electronic device 900a may receive data from an external electronic device 990a in the background. According to one embodiment, the electronic device 900a may identify size information (e.g. 100 MB) of the data received in the background.

According to one embodiment, when size information (100 MB) of data received in the background is identified, the electronic device 900a may output two times of vibration through the motor 551 on the basis of the identified size information (100 MB) of the data.

Figure 9B:
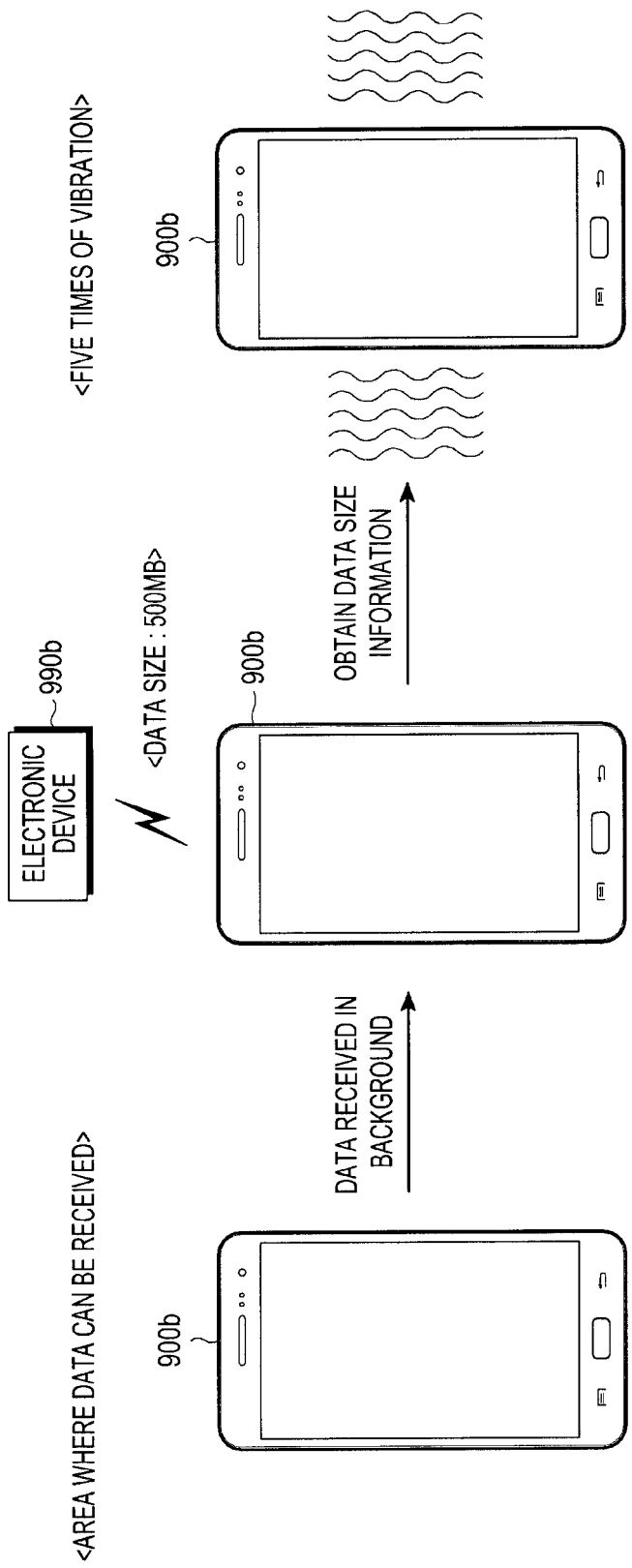
FIG. 9B illustrates another example of a method of outputting tactile notification by the electronic device on the basis of a characteristic of the received data according to one embodiment of the present disclosure.

FIG. 9B illustrates another example of a method of outputting tactile notification by the electronic device on the basis of a characteristic of the received data according to one embodiment of the present disclosure.

As shown in FIG. 9B, according to one embodiment, when an electronic device 900b moves to an area where data can be received, the electronic device 900b may receive data from an electronic device 990b in the background and may identify size information (e.g. 500 MB) of data received in the background.

According to one embodiment, when size information (500 MB) of data received in the background is identified, the electronic device 900b may output five times of vibration through the motor 551 on the basis of the identified size information (500 MB) of the data.

As described above with reference to FIGS. 9A and 9B, the larger the size of the data received in the background, the more the number of times of vibration may be output by the electronic devices 900a and 900b. Further, the smaller the size of the data, the fewer the number of times of vibration may be output by the electronic devices 900a and 900b.

Figure 10A:
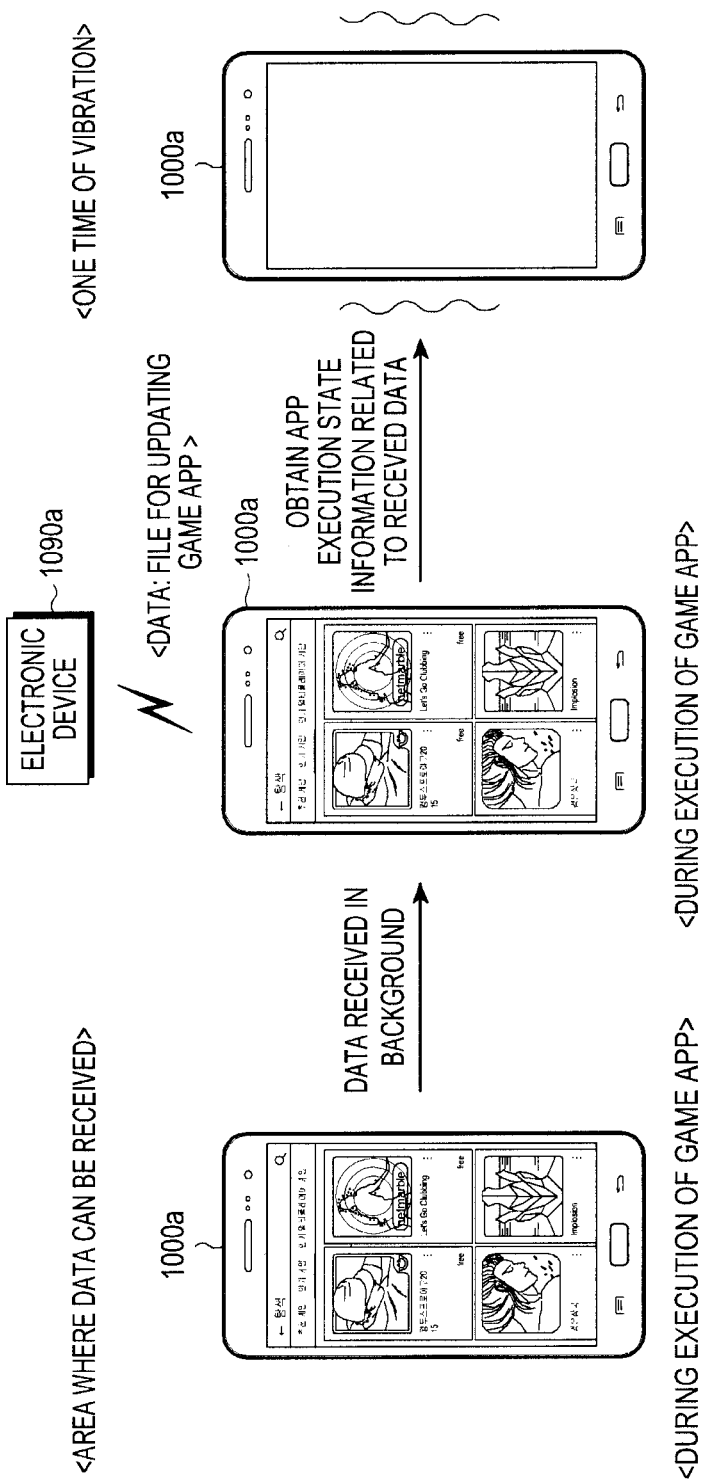
FIG. 10A illustrates another example of a method of outputting tactile notification by the electronic device on the basis of a characteristic of the received data according to one embodiment of the present disclosure.

FIG. 10A illustrates another example of a method of outputting tactile notification by the electronic device on the basis of a characteristic of the received data according to one embodiment of the present disclosure.

As shown in FIG. 10A, when an electronic device 1000a moves to an area where data can be received, the electronic device 1000a may receive data from an electronic device 1090a in the background, and may identify execution state information (e.g. the game app is currently executing) of an application related to data (e.g. game app update file) received in the background.

According to one embodiment, when it is determined that an application (e.g. game app) related to data received in the background is a currently being executed, the electronic device 1000a may output one time of vibration.

Figure 10B:
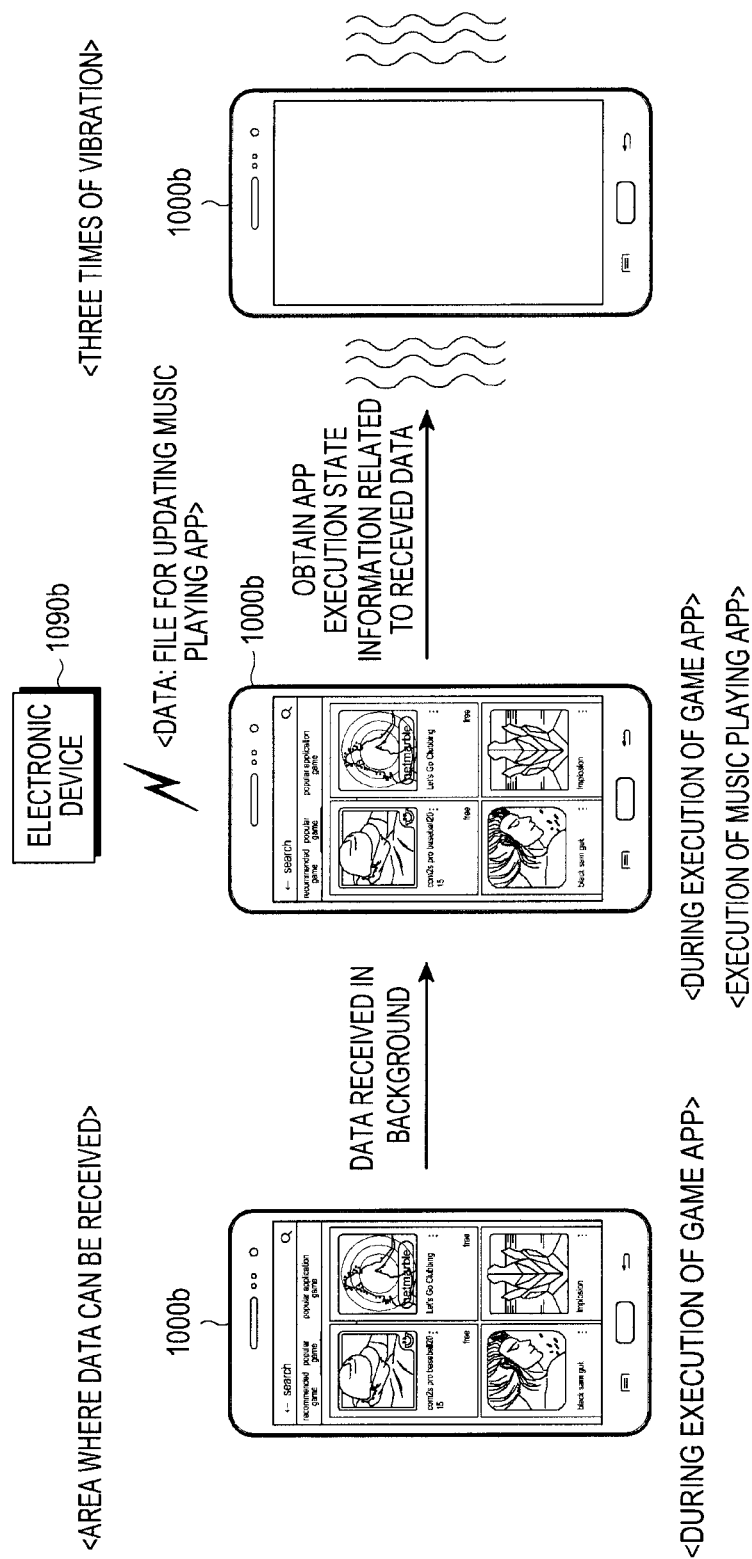
FIG. 10B illustrates another example of a method of outputting tactile notification by the electronic device on the basis of a characteristic of the received data according to one embodiment of the present disclosure.

FIG. 10B illustrates another example of a method of outputting tactile notification by the electronic device on the basis of a characteristic of the received data according to one embodiment of the present disclosure.

As shown in FIG. 10B, when an electronic device 1000b moves to an area where data can be received, the electronic device 1000b may receive data from an electronic device 1090b in the background, and may identify execution state information (e.g. the music reproduction app is currently executing) of an application related to data (e.g. music reproduction app update file) received in the background.

According to one embodiment, when it is determined that the application (music reproduction app) related to data received in the background is not currently being executed, the electronic device 1000b may output three times of vibration.

As described with reference to FIGS. 10A and 10B, the electronic devices 1000a and 1000b may determine whether the application related to data received in the background is executed by the electronic devices 1000a and 1000b, and the electronic devices 1000a and 1000b may output the vibration more number of times when the received data is related to an application which is not currently being executed, in comparison with when the received data is related to an currently executing application, or vice versa.

Figure 11A:
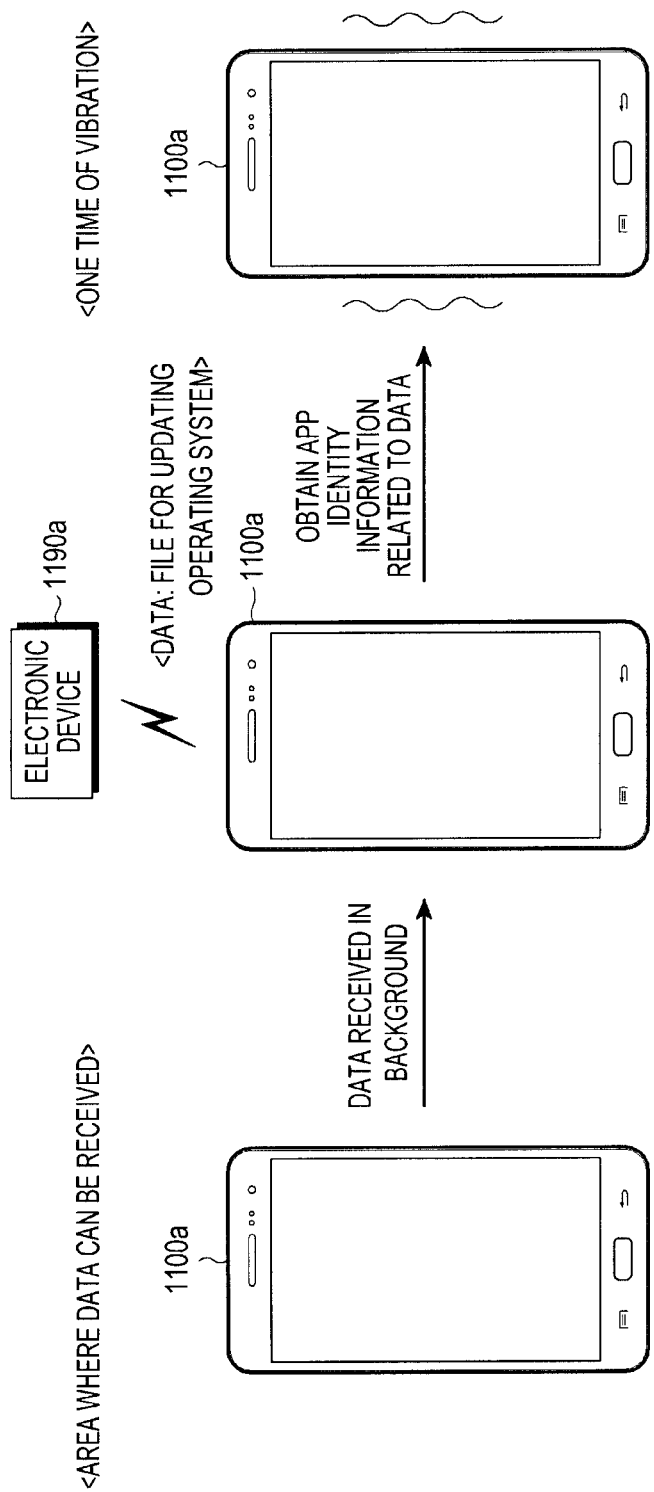
FIG. 11A illustrates another example of a method of outputting tactile notification by the electronic device on the basis of a characteristic of the received data according to one embodiment of the present disclosure.

FIG. 11A illustrates another example of a method of outputting tactile notification by the electronic device on the basis of a characteristic of the received data according to one embodiment of the present disclosure.

Referring to FIG. 11A, when an electronic device 1100a receives, for example, an update file to update the operating system of the electronic device 1100a from an external electronic device 1190a in the background, the electronic device 1100a may identify the identity of the software related to received data. In this example, the data is identified to be related to the operating system. The electronic device 1100a may output one time of vibration on the basis of the identified identity information (operating system) of application.

Figure 11B:
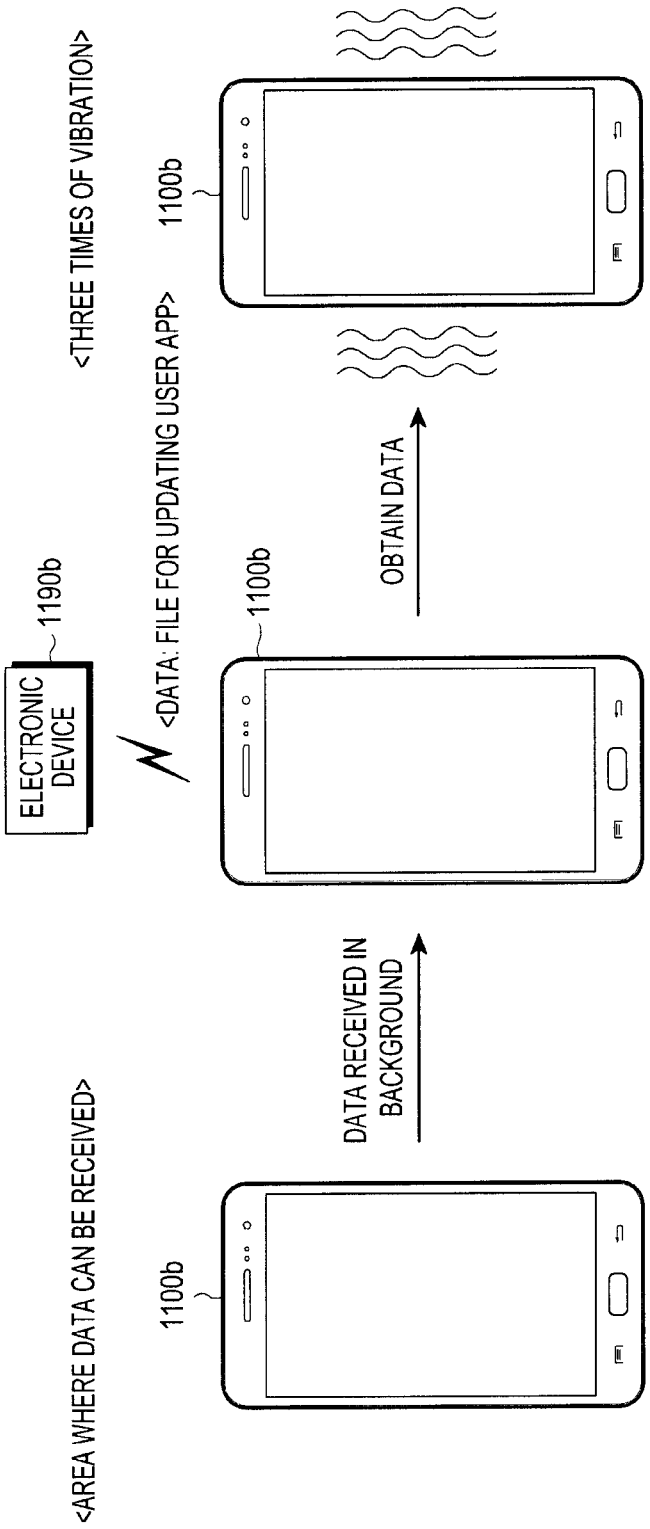
FIG. 11B illustrates another example of a method of outputting tactile notification by the electronic device on the basis of a characteristic of the received data according to one embodiment of the present disclosure.

FIG. 11B illustrates another example of a method of outputting tactile notification by the electronic device on the basis of a characteristic of the received data according to one embodiment of the present disclosure.

Referring to FIG. 11B, when an electronic device 1100b receives, from an external electronic device 1190b, an update file of a user app in the background (e.g. a music app), the electronic device 1100b may identify the identity of the application related to received data (e.g. music app). The electronic device 1100a may output three times of vibration on the basis of the identified identity information (music app) of the application.

As described with reference to FIGS. 11A and 11B, the electronic devices 1100a and 1100b may identify (or download identity information) the application related to the data received in the background, output fewer times of vibration when receiving an update file for basic system software, such as an update file for the operating system, which is more essential to the function of the electronic devices 1100a and 1100b, and output more times of vibration when receiving an update file related to a less essential application, or vice versa.

FIG. 12 illustrates an example of a method of controlling an output type by the electronic device on the basis of a characteristic of the received data according to one embodiment of the present disclosure.

According to one embodiment, when an electronic device 1200 receives data in the background, the electronic device 1200 may determine the number of times by which tactile notification (vibration) is output, on the basis of a characteristic of the received data.

Figure 12A:
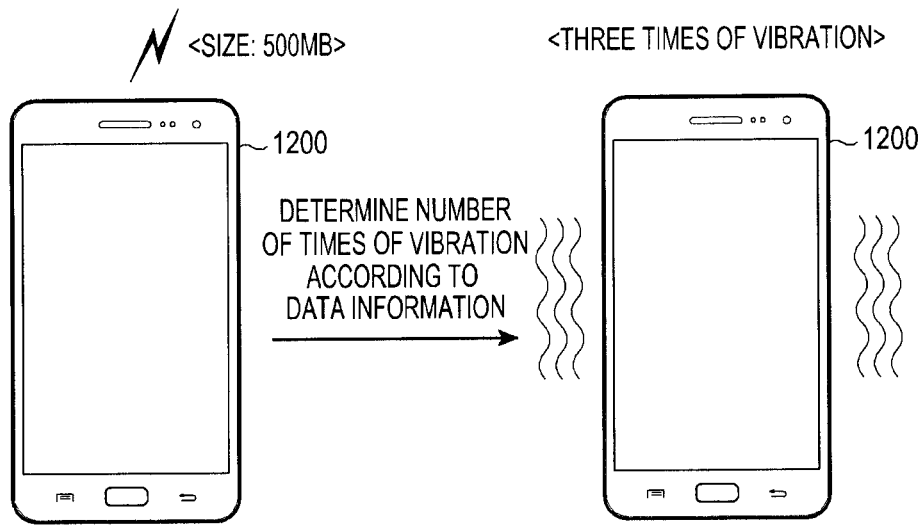
FIG. 12A and FIG. 12B illustrate an example of a method of controlling an output type by the electronic device on the basis of a characteristic of the received data according to one embodiment of the present disclosure.

For example, as shown in FIG. 12A, when the size of data received in the background is 500 MB, the electronic device 1200 may determine the number of times of vibration as three times on the basis of size information, and output the three times of vibration.

Figure 12B:
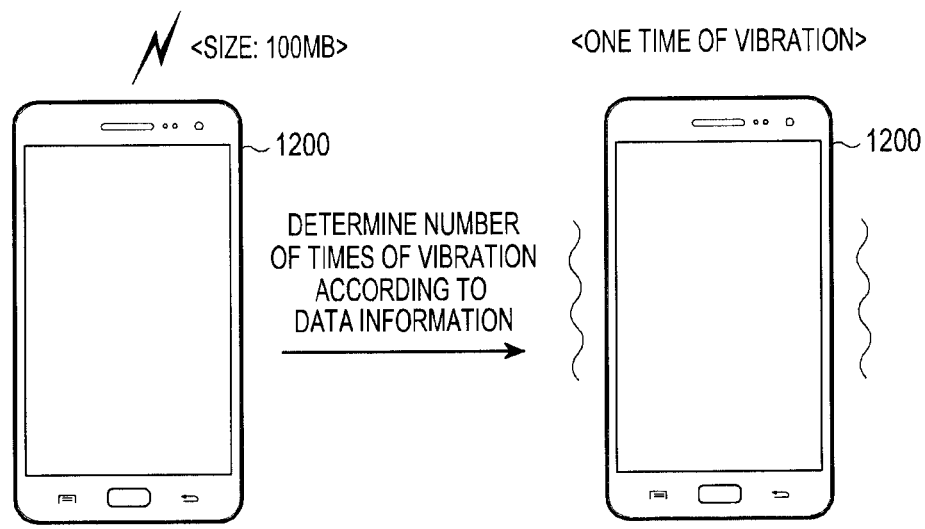

For example, as shown in FIG. 12B, when the size of data received in the background is 100 MB, the electronic device 1200 may determine fewer times of vibration in comparison with when the size of the data is 500 MB. For example, the electronic device 1200 may determine one time of vibration when the size of the data is 100 MB, and output the one time of vibration.

As described with reference to FIG. 12, the electronic device 1200 may output tactile notification by allowing the number of times of the tactile notification to be different on the basis of a characteristic of the received data. For example, the larger the size of the data, the more the number of times of tactile notification that is output by the electronic device 1200.

FIG. 13 illustrates another example of the method of controlling an output type by the electronic device on the basis of a characteristic of the received data according to one embodiment of the present disclosure.

According to one embodiment, when an electronic device 1300 receives data in the background, the electronic device 1300 may determine output strength of tactile notification (vibration), on the basis of a characteristic of the received data.

Figure 13A:
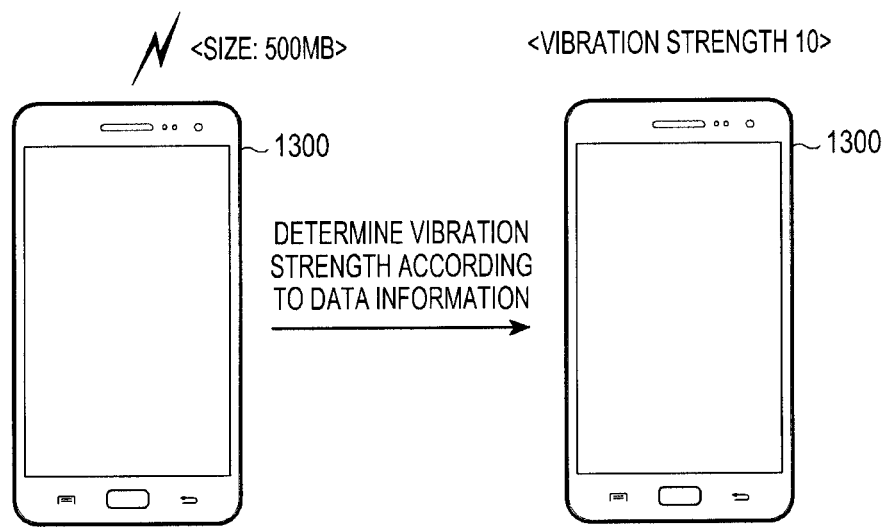
FIG. 13A and FIG. 13B illustrate another example of the method of controlling an output type by the electronic device on the basis of a characteristic of the received data according to one embodiment of the present disclosure.

For example, as shown in FIG. 13A, when the size of data received in the background is 500 MB, the electronic device 1300 may determine vibration strength (output strength) as "10" on the basis of the size information, and output the vibration at strength "10".

Figure 13B:
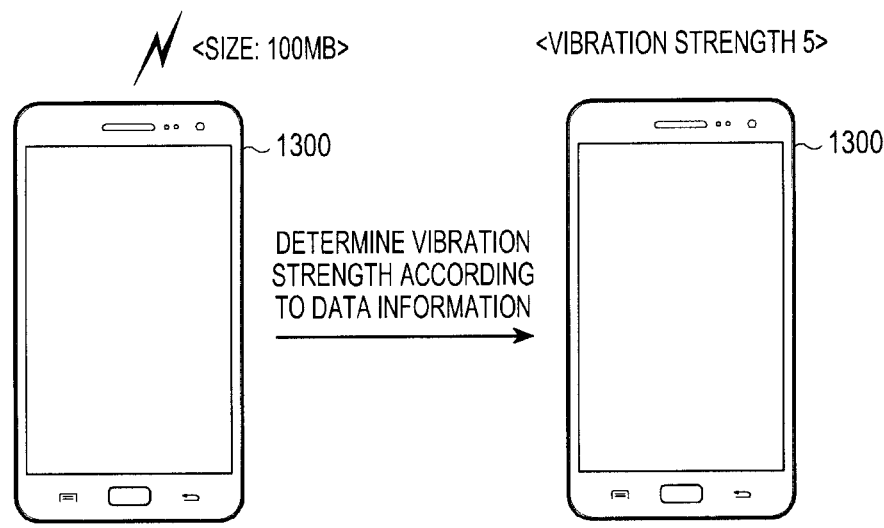

For example, as shown in FIG. 13B, when the size of data received in the background is 100 MB, the electronic device 1300 may determine a weaker strength of the vibration in comparison with when the size of the data is 500 MB. For example, the electronic device 1300 may determine the strength as, e.g., "5" on the basis of the size information, and output the vibration at strength "5".

As described with reference to FIG. 13, the electronic device 1300 may output tactile notification by allowing the strength (intensity) of the vibration to vary on the basis of a characteristic of the received data, such as size information. For example, the larger the size of the received data, the stronger the tactile notification outputted by the electronic device 1300.

FIG. 14 illustrates another example of the method of controlling an output type by the electronic device on the basis of a characteristic of the received data according to one embodiment of the present disclosure.

According to one embodiment, when an electronic device 1400 receives data in the background, the electronic device 1400 may determine an output cycle (vibration cycle) of the tactile notification (vibration), on the basis of a characteristic of the received data.

Figure 14A:
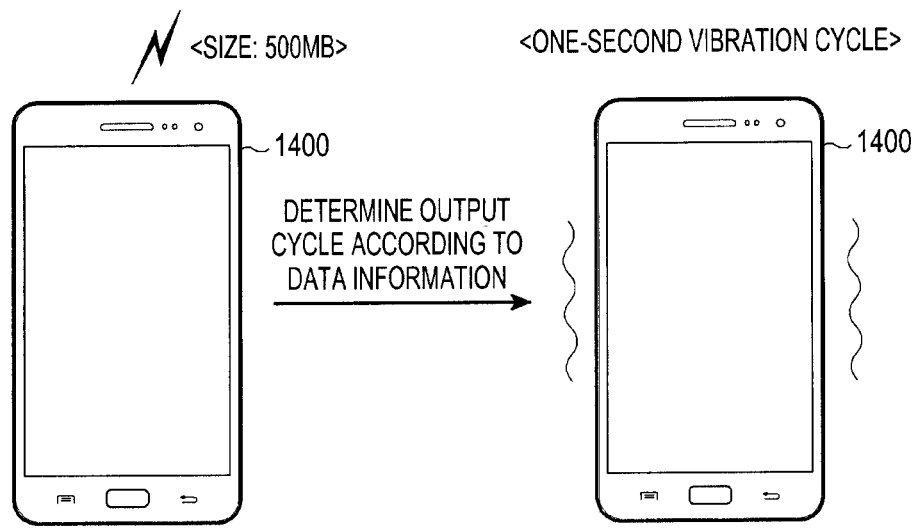
FIG. 14A and FIG. 14B illustrate another example of the method of controlling an output type by the electronic device on the basis of a characteristic of the received data according to one embodiment of the present disclosure.

For example, as shown in FIG. 14A, when the size of data received in the background is 500 MB, the electronic device 1400 may determine a vibration cycle as one second on the basis of the size information, and output vibration (tactile notification) every second.

Figure 14B:
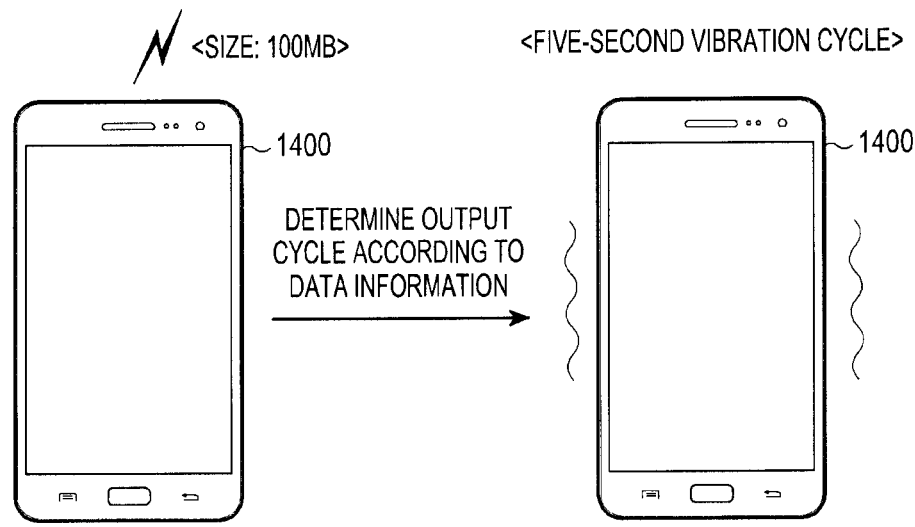

For example, as shown in FIG. 14B, when the size of data received in the background is 100 MB, the electronic device 1400 may determine a longer cycle of the vibration in comparison with when the size of the data is 500 MB. For example, the electronic device 1400 may determine the vibration cycle as, e.g., five seconds on the basis of the 100 MB size information, and output vibration every seconds.

As described with reference to FIG. 14, the electronic device 1400 may output tactile notification by allowing a cycle of tactile notification (vibration) to be different on the basis of a characteristic of the received data, such as size information. For example, the larger the size of the received data, the shorter the cycle of tactile notification which may be output by the electronic device 1400, or vice versa.

Figure 15:
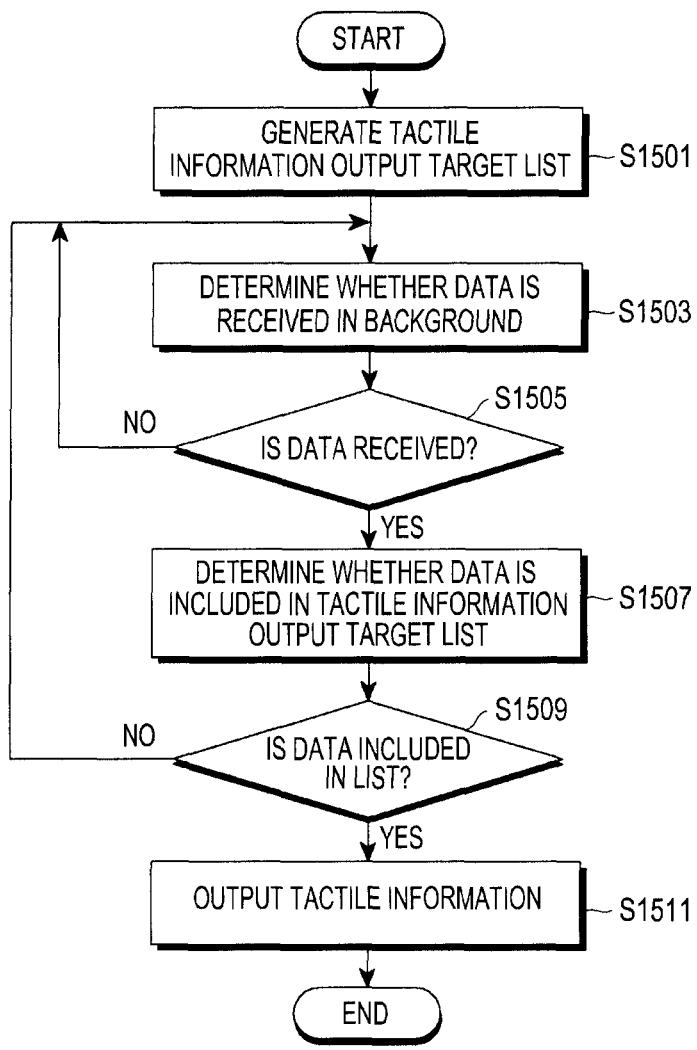
FIG. 15 is a flow chart illustrating a method of outputting tactile notification by the electronic device according to one embodiment of the present disclosure.

FIG. 15 is a flow chart illustrating a method of outputting tactile notification by the electronic device according to one embodiment of the present disclosure.

As shown in FIG. 15, in operation S1501, an electronic device (e.g., the electronic device 1400) may generate a tactile output target list. For example, the tactile output target list may include a condition for data received in the background as a condition by which the tactile notification is to be output.

In operation S1503, the electronic device 1400 may determine whether the data is received in the background.

In operation S1505, when the data is not received, the electronic device 1400 may loop back to operation S1503.

When the data is received in operation S1505, the electronic device 1400 may determine whether the received data corresponds or satisfies a condition in the tactile output target list in operation S1507.

When the received data corresponds or satisfies a condition in the tactile output target list in operation S1509, the electronic device 1400 may output the tactile notification in operation S1511.

When the received data does not correspond or satisfy a condition in the tactile output target list in operation S1509, the electronic device 1400 may loop back to operation S1503.

Figure 16A:
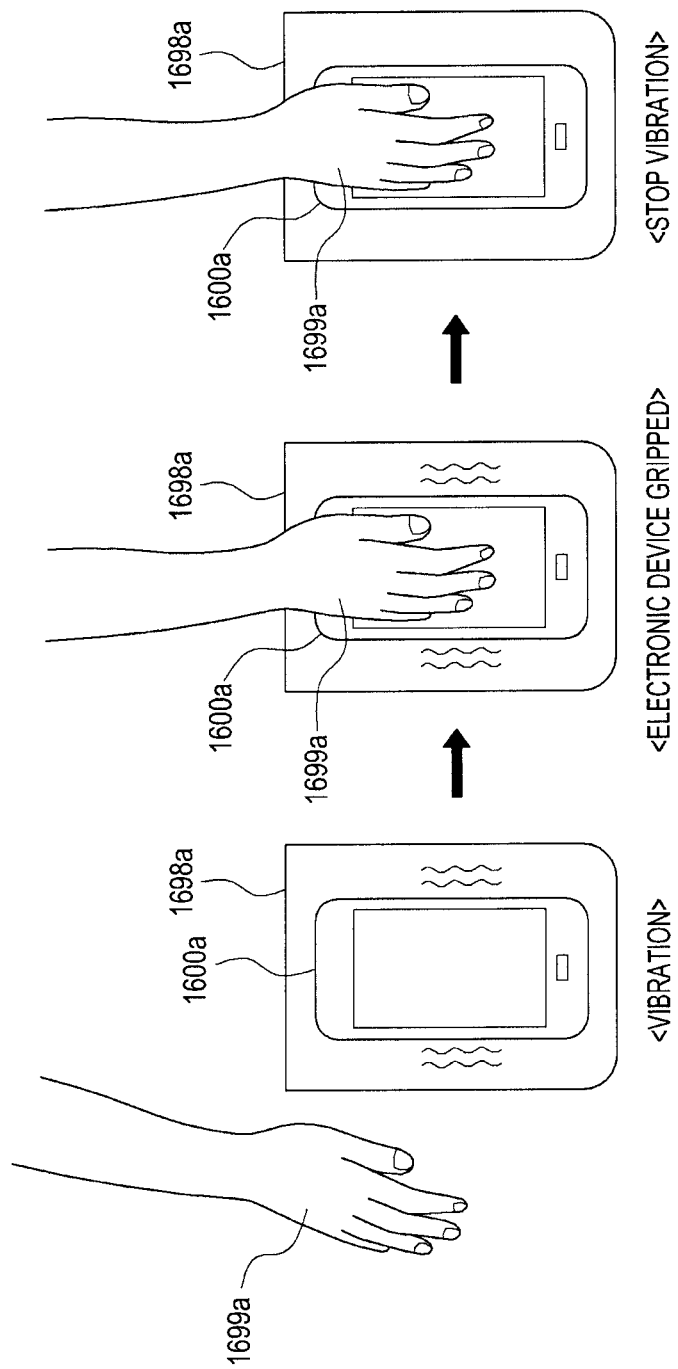
FIG. 16A illustrates an example of a method of interrupting the output by tactile notification of the electronic device according to one embodiment of the present disclosure.

FIG. 16A illustrates an example of a method of interrupting the output by tactile notification of the electronic device according to one embodiment of the present disclosure.

As shown in FIG. 16A, when tactile notification is output when the electronic device 1600*a* is in the user's pocket 1698*a*, the electronic device 1600*a* may determine whether a gripping input by the user's hand 1699*a* is received. Further, the electronic device 1600*a* may determine whether a touch input by the user's hand 1699*a* is received by the electronic device 1600*a*.

According to one embodiment, when the gripping input is received and/or the touch input is received, the electronic device 1600*a* may interrupt the output of the tactile notification.

Figure 16B:
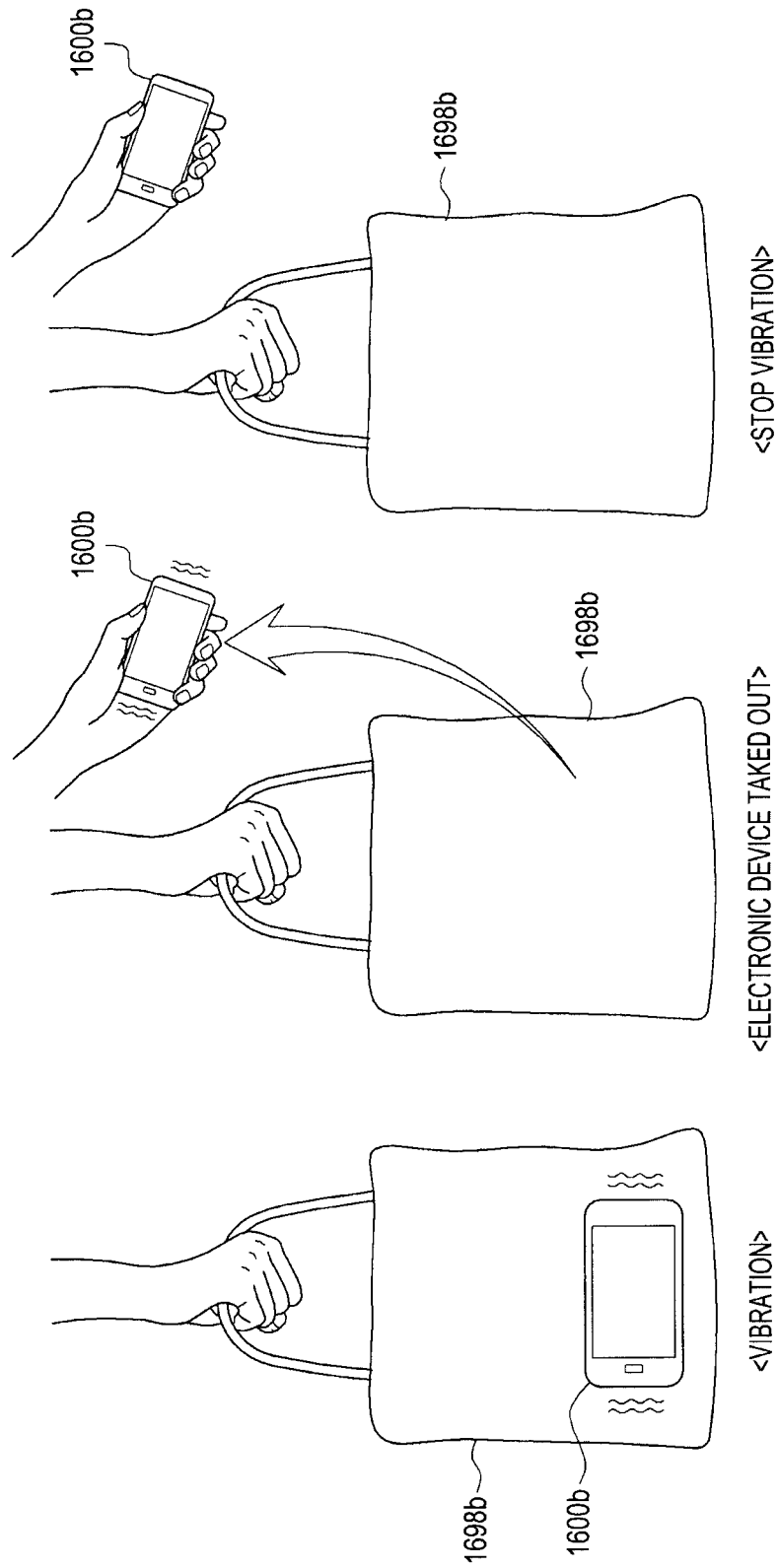
FIG. 16B illustrates another example of the method of interrupting the output of tactile notification by the electronic device according to one embodiment of the present disclosure.

FIG. 16B illustrates another example of the method of interrupting the output of tactile notification by the electronic device according to one embodiment of the present disclosure.

As shown in FIG. 16B, when tactile notification is output when the electronic device 1600*b* is in the user's bag 1698*b*, the electronic device 1600*b* may detect the external illuminance around the electronic device 1600*b* and a change of illuminance. According to one embodiment, the electronic device 1600*b* may determine whether the illuminance around the electronic device increases or decreases by a predetermined amount.

Further, the electronic device 1600*b* may determine whether a gripping input by the user's hand (e.g., 1699*b*) is received by the electronic device 1600*a*. Further or in the alternative, the electronic device 1600*b* may determine whether a touch input by the user's hand (e.g., 1699*b*) is received by the electronic device 1600*a*.

According to one embodiment, when it is detected that the external illuminance around the electronic device 1600*b* increases by a predetermined amount (i.e. when the electronic device 1600*b* moves from inside to outside of the user's bag 1698*b*), the electronic device 1600*b* may interrupt the output of the tactile notification.

Figure 16C:
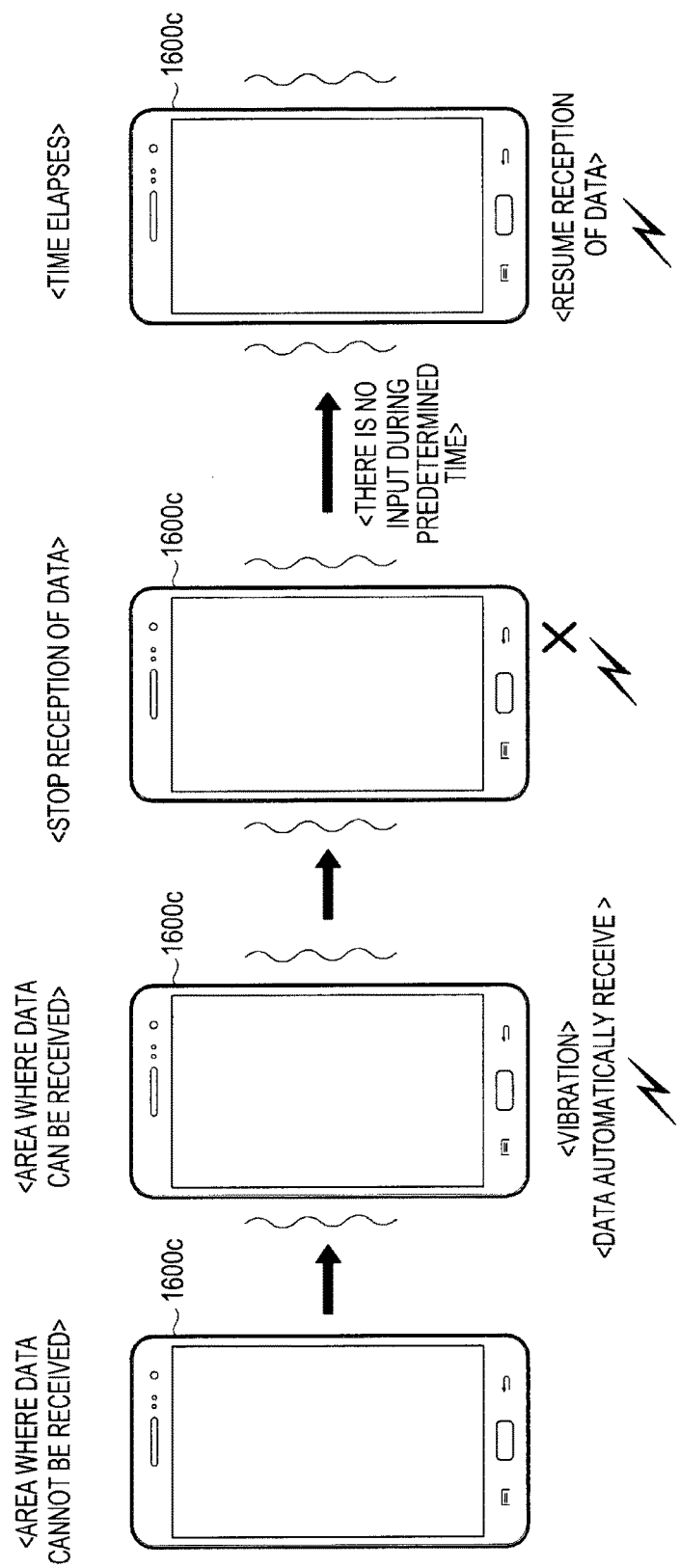
FIG. 16C illustrates a method of resuming an interrupted output of the tactile notification by the electronic device according to one embodiment of the present disclosure.

FIG. 16C illustrates a method of resuming an interrupted output of the tactile notification by the electronic device according to one embodiment of the present disclosure.

As shown in FIG. 16C, when an electronic device 1600*c* moves from an area where data cannot be received to an area where data can be received, the electronic device 1600*c* may automatically receive data in the background, and may output vibration (tactile notification).

According to one embodiment, when the data is automatically received in the background, the electronic device 1600*c* may interrupt the reception of the data before outputting the tactile notification.

According to one embodiment, when the reception of the data is interrupted, when the electronic device 1600*c* determines that no user input is received for a predetermined time interval, including a touch input, a gripping input, and an illuminance change, the electronic device 1600*c* may determine the lack of input as the user allowing for the data reception. Accordingly, the electronic device 1600*c* may resume the interrupted data reception operation.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. Any of the functions and steps provided in the Figures may be implemented in hardware, or a combination hardware configured with machine executable code and may be performed in whole or in part within the programmed instructions of a computer. No claim element herein is to be construed under the provisions of 35 U.S.C. 112, sixth paragraph, unless the element is expressly recited using the phrase "means for."

What is claimed is:

1. A method of controlling an electronic device, the method comprising:
   in response to a change of data communication environment, determining whether to automatically receive data by a background process of the electronic device while graphical data different from the data is displayed through a display of the electronic device or while the display is turned off; and
   in response to determining to automatically receive the data, outputting a tactile notification notifying initiation of the reception of the data before the data is completely received.

2. The method of claim 1, further comprising:
   generating a tactile output target list that identifies one or more conditions for outputting the tactile notification, wherein outputting the tactile notification comprises:
   determining whether the data corresponds to at least one condition in the tactile output target list; and
   outputting the tactile notification when the data corresponds to at least one condition in the tactile output target list.

3. The method of claim 1, further comprising:
   identifying one or more characteristics of the data, wherein outputting the tactile notification comprises outputting the tactile notification based on the identified characteristics.

4. The method of claim 3, wherein the one or more characteristics of the data is a size information of the data.

5. The method of claim 3, wherein the one or more characteristics of the data is an execution state of a program related to the data.

6. The method of claim 3, the one or more characteristics of the data is an identity of a program related to the data.

7. The method of claim 3, wherein outputting the tactile notification based on the identified characteristics comprises:
   determining a number of times to output the tactile notification based on the identified characteristics; and
   outputting the tactile notification the determined number of times.

8. The method of claim 3, wherein outputting the tactile notification based on the identified characteristics comprises: determining an output strength of the tactile notification based on the identified characteristics; and
   outputting the tactile notification having the determined output strength.

9. The method of claim 3, wherein outputting the tactile notification based on the identified characteristics comprises:
   determining an output cycle of the tactile notification based on the identified characteristics; and
   outputting the tactile notification having the determined output cycle.

10. The method of claim 1, further comprising:
    determining whether a gripping input is detected by the electronic device within a predetermined time interval of the output of the tactile notification; and
    interrupting the output of the tactile notification when the gripping input is detected within the predetermined time interval.

11. The method of claim 1, further comprising:
    determining whether a touch input is detected by the electronic device within a predetermined time interval of the output of the tactile notification; and
    interrupting the output of the tactile notification when the touch input is detected within the predetermined time interval.

12. The method of claim 1, further comprising:
determining whether an external illuminance of the electronic device increases by a predetermined amount within a predetermined time interval of the output of the tactile notification; and
interrupting the output of the tactile notification when the external illuminance increases by the predetermined amount within the predetermined time interval.

13. The method of claim 1, further comprising:
interrupting the reception of the data before outputting the tactile notification.

14. The method of claim 13, further comprising:
resuming the reception of the data after a predetermined time interval elapses without additional user input.

15. The method of claim 1, wherein the outputting of the tactile notification is a haptic effect.

16. An electronic device comprising:
a communication module;
an output module comprising at least one of a motor configured to output a tactile notification or a display configured to output a visual notification; and
a processor configured to determine, in response to a change of data communication environment, whether to automatically receive data, through the communication module, by a background process of the electronic device while graphical data different from the data is displayed through a display of the electronic device or while the display is turned off and output, in response to determining to automatically receive the data, through the output module, the tactile notification notifying initiation of the reception of the data before the data is completely received.

17. The electronic device of claim 16, wherein the processor is further configured to:
generate a tactile output target list that identifies one or more conditions for outputting the tactile notification,
determine whether the data corresponds to at least one condition in the tactile output target list, and
output, through the output module, the tactile notification when the data corresponds to at least one condition in the tactile output target list.

18. The electronic device of claim 16, wherein the processor is further configured to:
identify one or more characteristics of the data, and
output, through the output module, the tactile notification based on the identified characteristics.

19. The electronic device of claim 18, wherein the one or more characteristics of the data is a size information of the data.

20. The electronic device of claim 18, wherein the one or more characteristics of the data is an execution state information of a program related to the data.

* * * * *